(12) United States Patent
Ikeda et al.

(10) Patent No.: US 11,541,571 B2
(45) Date of Patent: Jan. 3, 2023

(54) BUILDING MATERIAL MANUFACTURING APPARATUS AND BUILDING MATERIAL MANUFACTURING METHOD

(71) Applicant: NICHIHA CORPORATION, Nagoya (JP)

(72) Inventors: Satoshi Ikeda, Nagoya (JP); Kazuhisa Yoshida, Nagoya (JP); Hidenori Nishioka, Nagoya (JP); Akihiro Sugimoto, Nagoya (JP)

(73) Assignee: NICHIHA CORPORATION, Nagoya (JP)

( * ) Notice: Subject to any disclaimer, the term of this patent is extended or adjusted under 35 U.S.C. 154(b) by 85 days.

(21) Appl. No.: 16/904,946

(22) Filed: Jun. 18, 2020

(65) Prior Publication Data

US 2020/0316815 A1 Oct. 8, 2020

Related U.S. Application Data

(63) Continuation of application No. PCT/JP2018/047668, filed on Dec. 25, 2018.

(30) Foreign Application Priority Data

Dec. 27, 2017 (JP) .............................. JP2017-252530

(51) Int. Cl.
 *B28B 13/02* (2006.01)
 *B28B 5/02* (2006.01)
(52) U.S. Cl.
 CPC .............. *B28B 13/029* (2013.01); *B28B 5/02* (2013.01)
(58) Field of Classification Search
 CPC ........... B28B 13/029; B28B 5/02; B28B 1/16; B28B 1/526; B07B 13/113
 See application file for complete search history.

(56) References Cited

U.S. PATENT DOCUMENTS

| 3,971,715 A | * | 7/1976 | Wehner | .................. | B01D 35/20 |
| | | | | | 209/310 |
| 5,393,214 A | * | 2/1995 | Irie | .......................... | B27N 3/14 |
| | | | | | 264/112 |

(Continued)

FOREIGN PATENT DOCUMENTS

| CH | 539502 A | 9/1973 |
| CN | 102303355 A | 1/2012 |

(Continued)

OTHER PUBLICATIONS

Chinese Office Action for Chinese Application No. 201880063724.7, dated Apr. 28, 2021, with English translation.

(Continued)

*Primary Examiner* — Kelly M Gambetta
*Assistant Examiner* — Virak Nguon
(74) *Attorney, Agent, or Firm* — Birch, Stewart, Kolasch & Birch, LLP

(57) ABSTRACT

Provided is a building material manufacturing apparatus and a building material manufacturing method that are suitable for efficiently manufacturing a building material while suppressing clogging of a sieve portion for sieving the building raw material. The building material manufacturing apparatus of the present invention includes, for example, a sieve portion 10 and a receiving tool 30. The sieve portion 10 includes a receiving and sending sheet 11 with no sieve openings, onto which the building raw material M is dropped, and at least one sieve sheet 12 with sieve openings that is located below the sheet. The receiving and sending sheet 11 and the sieve sheet 12 can perform undulating motion, are inclined, and are arranged side by side in the inclination direction. The receiving tool 30 is for receiving the building raw material M that has passed through the sieve openings of the sieve portion 10. In the building material manufacturing method of the present invention, for (Continued)

example, in a state in which the receiving and sending sheet 11 and the at least one sieve sheet 12 are performing undulating motion, the building raw material M is dropped onto the receiving and sending sheet 11, moved from the receiving and sending sheet 11 onto the sieve sheet 12, subjected to sieving by the sieve sheet 12, and the portion that passes through the sieve openings of the sieve sheet 12 is accumulated on the receiving tool 30, whereby a mat with at least one layer is formed.

6 Claims, 18 Drawing Sheets

(56) References Cited

U.S. PATENT DOCUMENTS

| | | | |
|---|---|---|---|
| 5,415,821 A | 5/1995 | Irie et al. | |
| 2005/0274653 A1* | 12/2005 | LaVeine | B07B 1/4645 |
| | | | 209/310 |
| 2013/0126398 A1* | 5/2013 | LaVeine | B07B 1/485 |
| | | | 209/365.1 |

FOREIGN PATENT DOCUMENTS

| | | | |
|---|---|---|---|
| CN | 107029986 A | | 8/2017 |
| CN | 206676728 U | | 11/2017 |
| JP | 6-15628 A | | 1/1994 |
| JP | 7-124926 A | | 5/1995 |
| JP | 8-244020 A | | 9/1996 |
| JP | 2014-200723 A | | 10/2014 |
| JP | 2017-7229 A | | 1/2017 |
| JP | 2017-193181 A | | 10/2017 |
| JP | 2017193181 A | * | 10/2017 |
| WO | WO 2005/123278 A2 | | 12/2005 |

OTHER PUBLICATIONS

Extended European Search Report for European Application No. 18897814.2, dated Jul. 23, 2021.

International Search Report, issued in PCT/JP2018/047668, dated Feb. 5, 2019.

Written Opinion of the International Searching Authority, issued in PCT/JP2018/047668, dated Feb. 5, 2019.

* cited by examiner (a)

(b)

(c)

(d)

BUILDING MATERIAL MANUFACTURING APPARATUS AND BUILDING MATERIAL MANUFACTURING METHOD

TECHNICAL FIELD

The present invention relates to an apparatus and a method for manufacturing building material such as board material for construction.

BACKGROUND ART

Examples of building material serving as board material for construction for forming an outer wall and an inner wall of a building include inorganic boards such as fiber reinforced cement siding boards and ceramic boards, fiber boards such as particle boards, and resin boards.

As one method for manufacturing these types of building materials, a method is known which includes a step of forming a raw material mat by sieving powder raw material, which is building raw material, through winnowing and accumulating raw materials of a predetermined size resulting from the sieving on a receiving tool or the like, and a step of performing heat pressing on the raw material mat. A building material manufacturing method in which this kind of procedure is used is described in, for example, Patent Document 1 below.

CITATION LIST

Patent Documents

Patent Document 1: JP H7-124926A

SUMMARY OF INVENTION

Technical Problem

A conventional type of apparatus for implementing the above-described building material manufacturing method includes, as mechanisms for the mat formation step: a sieve portion in which, for example, sieving through winnowing is performed; a raw material supply portion for supplying a powder raw material to the sieve portion by dropping the powder raw material onto the sieve portion; and a receiving tool for receiving raw material of a predetermined size resulting from sieving. The powder raw material to be used is obtained by adding water to a powder solid, which is a building material forming material, for the purpose of adjusting the water content.

The sieve portion includes an air blower for blowing air on the falling powder raw material in a lateral direction, and a sieve screen that is disposed at a position opposing the air from the air blower and is inclined by a predetermined degree so as to be spaced farther apart from the air blower the higher up it is. When the apparatus is running, the powder raw material is allowed to fall from the raw material supply portion to the space between the air blower and the sieve screen, is blown by the air blown from the air blower to the sieve screen, and portions of the powder raw material pass through sieve screen and a sieve opening thereof, fall further down, and are received by the receiving tool (the other portions fall without being able to pass through the sieve screen). Then, the portion of the powder raw material that has passed through the sieve screen accumulates on the receiving tool, whereby a raw material mat is formed.

With the sieve portion of the conventional building material manufacturing apparatus including this kind of mechanism, while the apparatus is running, the powder raw material, which is damp and adhesive, receives a pressing action due to the air from the air blower, and the powder raw material continues to be sorted by the sieve openings of the sieve screen. In this kind of sieving through winnowing, adhesion of the powder raw material to the sieve screen is likely to occur, and thus clogging of the sieve screen is likely to occur. This kind of clogging requires time, labor, and the like for the maintenance of the sieve screen, and thus is not preferable.

The present invention was conceived based on such circumstances, and an object thereof is to provide an apparatus and a method that are suitable for efficiently manufacturing building material while suppressing clogging of a sieve portion for sieving building raw material.

Solution to Problem

According to a first aspect of the present invention, a building material manufacturing apparatus is provided. This building material manufacturing apparatus includes a sieve portion and a receiving tool. The sieve portion includes a receiving and sending sheet with no sieve openings, onto which the building raw material is to be dropped, and at least one sieve sheet with sieve openings. The receiving and sending sheet and the at least one sieve sheet are inclined and arranged side by side in the direction of the inclination, and the sieve sheet is located below the receiving and sending sheet. The receiving and sending sheet and the sieve sheet are configured to perform undulating motion when the apparatus is running. Also, the receiving tool is for receiving the building raw material that has passed through the sieve openings of the sieve portion.

When the building material manufacturing apparatus is running, in a state in which the sheets included in the sieve portion are performing undulating motion, the raw material is supplied to the present apparatus due to the building raw material such as the powder raw material being dropped onto the receiving and sending sheet of the sieve portion. The undulating motion of the sheets is, for example, motion that has an antinode at which the sheet repeats vibration in its thickness direction, and the smaller the period of the vibration is, the faster the undulating motion is. This undulating motion is realized by, for example, the running of a shaker such as an eccentric-type shaker that is joined to the sheets via a predetermined power transmission mechanism.

Some of the building raw material that is supplied to the present apparatus is in the form of bulky clumps. The above-described configuration, in which the present apparatus is equipped with a receiving and sending sheet having no sieve openings and a large area of contact with the raw material as a location that first receives the building raw material in the sieve portion, is suitable for crushing the building raw material in the form of a bulky clump through collision with the receiving and sending sheet that performs undulating motion, before the building raw material reaches the sieve sheet of the sieve portion. The further the crushing of the building raw material progresses before the building raw material reaches the sieve sheet of the sieve portion, the more clogging of the sieve sheet tends to be suppressed.

In addition, the above-described configuration, in which the present apparatus is equipped with a receiving and sending sheet with no sieve openings and a large area of contact with the raw material as a location that first receives, in the sieve portion, the building raw material that is to be supplied to the present apparatus, is suitable for dispersing the building raw material in, for example, a sheet width direction through collision with the receiving and sending sheet that performs undulating motion, before the building raw material reaches the sieve sheet of the sieve portion. The more the building raw material is dispersed before reaching the sieve sheet of the sieve portion, the more clogging of the sieve sheet tends to be suppressed.

When the present building material manufacturing apparatus is running, the building raw material obtained through the above-described crushing and dispersion by the receiving and sending sheet that performs undulating motion undergoes sieving by the sieve sheets with sieve openings while traveling down on multiple sheets that are inclined, including the receiving and sending sheet (the sheets continue the undulating motion). Then, the portion of the building raw material that is generated due to the sieving in the sieve portion and has passed through the sieve openings of the sieve sheets (the portion of the building raw material that has passed through the sieve sheet sieve openings) is accumulated on the receiving tool, whereby a raw material mat is formed. A predetermined building material serving as a board material is manufactured by subjecting this raw material mat to a heat-pressing step.

As described above, the building material manufacturing apparatus according to the first aspect of the present invention is suitable for manufacturing a building material while suppressing clogging of a sieve sheet in a sieve portion for sieving the building raw material. Suppression of clogging of the sieve sheet is preferable for reducing the amount of time and labor required for maintenance of the sieve sheet and the sieve portion, and thus is preferable from the viewpoint of suppressing the cost of manufacturing the building material.

The present building material manufacturing apparatus preferably further includes a raw material supplying portion that has a conveyor for sending the building raw material to a location above a receiving and sending sheet of the sieve portion and a leveling portion for leveling the building raw material sent on the conveyor. If the present building material manufacturing apparatus includes this raw material supplying portion, when the present apparatus is running, the building raw material is supplied by being dropped from the terminal end of the conveyor of the raw material supplying portion to the receiving and sending sheet in the sieve portion.

The configuration in which the present building material manufacturing apparatus includes this raw material supplying portion is preferable for suppressing clogging of the sieve sheet in the sieve portion. Specifically, the leveling step performed by the above-described leveling portion on the building raw material that is sent on the conveyor of the raw material supplying portion is suitable for evening out the supply flow rate of the building raw material that is supplied by being dropped from the terminal end of the conveyor to the receiving and sending sheet, and thus is preferable for suppressing deviation of the building raw material on the series of sheets in the sieve portion and suppressing clogging of the sieve sheets.

The sieve portion of the present building material manufacturing apparatus preferably includes, as the above-described sieve sheets, a fine sieve sheet with small sieve openings, and a coarse sieve sheet that is located below the fine sieve sheet and has large sieve openings. According to this configuration, the building raw material that has been supplied to the sieve portion and undergone the above-described crushing and dispersion on the receiving and sending sheet can be subjected to sieving by the fine sieve sheet below the receiving and sending sheet, and furthermore, to sieving by the coarse sieve sheet below the fine sieve sheet.

The sieve portion of the present building material manufacturing apparatus further include a relay sheet with no sieve openings that is located between the fine sieve sheet and the coarse sieve sheet and can perform undulating motion.

According to this configuration, after passing through the fine sieve sheet in the sieve portion and before reaching the coarse sieve sheet when the apparatus is running, the building raw material can be subjected to crushing and dispersion through collision with the relay sheet, which has no sieve openings and has a large area of contact with the raw material (the sheets perform undulating motion). Before reaching the coarse sieve sheet, the more the crushing of the building raw material progresses and the more the building raw material is dispersed, the more clogging of the coarse sieve sheet tends to be suppressed.

The present building material manufacturing apparatus preferably further includes a raw material supplying portion for dropping the building raw material onto the above-described relay sheet. With this kind of configuration, a building raw material that is supplied from the raw material supplying portion to the sieve portion can also be subjected to crushing and dispersion through collision with a relay sheet that has no sieve openings and has a large area of contact with the raw material, before reaching the coarse sieve sheet. Accordingly, this configuration is preferable for suppressing clogging of the coarse sieve sheet.

According to a second aspect of the present invention, a building material manufacturing method is provided. In the present manufacturing method, a sieve portion and a receiving tool are used. The sieve portion includes a receiving and sending sheet with no sieve openings, onto which building raw material is to be dropped, and at least one sieve sheet with sieve openings that is located below the receiving and sending sheet. The receiving and sending sheet and the sieve sheet can perform undulating motion, and the receiving and sending sheet and the sieve sheet are inclined and arranged side by side in the direction of the inclination. Also, the receiving tool is for receiving the building raw material that has passed through the sieve openings of the sieve portion.

In the present manufacturing method, in a state in which the receiving and sending sheet and at least one sieve sheet are performing undulating motion, the building raw material is dropped onto the receiving and sending sheet, the building raw material is moved onto at least one sieve sheet from the receiving and sending sheet, the building raw material is sieved by at least one sieve sheet, and the building raw material that has passed through the sieve openings of the at least one sieve sheet is accumulated on a receiving tool, and thereby a mat (raw material mat) of at least one layer is formed. The predetermined building material serving as the board material is manufactured through a step of heat-pressing the mat.

In the present manufacturing method, in a state in which the sheets included in the sieve portion are performing undulating motion, the building raw material such as the powder raw material is dropped onto the receiving and sending sheet of the sieve portion. Some of the dropped building raw material is also in the form of bulky clumps. The above-described configuration, in which a receiving and sending sheet having no sieve openings and a large area of contact with the raw material is used as a location that first receives the building raw material in the sieve portion, is suitable for crushing the building raw material in the form of a bulky clump through collision with the receiving and sending sheet that performs undulating motion, before the building raw material reaches the sieve sheet of the sieve portion. The further the crushing of the building raw material progresses before the building raw material reaches the sieve sheet of the sieve portion, the more clogging of the sieve sheet tends to be suppressed.

In addition to this, the above-described configuration in which a receiving and sending sheet that has no sieve openings and has a large area of contact with the raw material is used as the location at which the dropped building raw material is first received in the sieve portion is suitable for dispersing the building raw material in, for example, the sheet width direction through collision with the receiving and sending sheet that performs undulating motion, before the building raw material reaches the sieve sheet of the sieve portion. The more the building raw material is dispersed before reaching the sieve sheet of the sieve portion, the more clogging of the sieve sheet tends to be suppressed.

With the present manufacturing method, the building raw material that has been subjected to the above-described crushing and dispersion on the receiving and sending sheet that performs undulating motion travels down multiple sheets that are inclined, including the receiving and sending sheet, and specifically, is moved from the receiving and sending sheet onto at least one sieve sheet, and is subjected to sieving using a sieve sheet with sieve openings (the sheets continue the undulating motion). Then, the portion of the building raw material that is generated through sieving in the sieve portion and has passed through the sieve openings of the sieve sheet is accumulated on the receiving tool, whereby a raw material mat is formed. A predetermined building material serving as a board material is manufactured by subjecting this raw material mat to a heat-pressing step.

As described above, the building material manufacturing method according to the second aspect of the present invention is suitable for manufacturing a building material while suppressing clogging of a sieve sheet in a sieve portion for sieving the building raw material. Suppression of clogging of the sieve sheet is preferable for reducing the amount of time and labor required for maintenance of the sieve sheet and the sieve portion, and thus is preferable from the viewpoint of suppressing the cost of manufacturing the building material.

With the present building material manufacturing method, preferably, a raw material supplying portion is further used, which has a conveyor for sending the building raw material up onto a receiving and sending sheet of the sieve portion, and a leveling portion for leveling the building raw material sent on the conveyor, and the building raw material leveled by the leveling portion is dropped onto the receiving and sending sheet.

This configuration is preferable for suppressing clogging of the sieve sheet of the sieve portion. Specifically, the leveling step performed by the above-described leveling portion on the building raw material that is sent on the conveyor of the raw material supplying portion is suitable for evening out the supply flow rate of the building raw material that is supplied by being dropped from the terminal end of the conveyor to the receiving and sending sheet, and thus is preferable for suppressing deviation of the building raw material on the series of sheets in the sieve portion and suppressing clogging of the sieve sheets.

In a preferred mode of the present manufacturing method, the sieve portion includes, as the above-described sieve sheets, a fine sieve sheet with small sieve openings, and a coarse sieve sheet that is located below the fine sieve sheet and has large sieve openings. A mat having a layer formed by the building raw material that has passed through the sieve openings of the fine sieve sheet and a layer formed by the building raw material that has passed through the sieve openings of the coarse sieve sheet is formed on the receiving tool.

According to this mode, the building raw material that has been supplied to the sieve portion and has undergone the above-described crushing and dispersion on the receiving and sending sheet can be subjected to sieving by the fine sieve sheet below the receiving and sending sheet, and furthermore, to sieving by the coarse sieve sheet below the fine sieve sheet.

In a preferred mode of the present manufacturing method, the sieve portion further includes a relay sheet with no sieve openings, which is located between the fine sieve sheet and the coarse sieve sheet and can perform undulating motion, and in a state in which the relay sheet is also performing undulating motion in addition to the receiving and sending sheet and the sieve sheet, the building raw material that does not pass through the sieve openings of the fine sieve sheet is moved onto the coarse sieve sheet via the relay sheet.

According to this mode, after passing through the fine sieve sheet in the sieve portion and before reaching the coarse sieve sheet, the building raw material can be subjected to crushing and dispersion through collision with the relay sheet, which has no sieve openings and has a large area of contact with the raw material (the sheets perform undulating motion). The more the crushing of the building raw material progresses and the more the building raw material is dispersed before reaching the coarse sieve sheet, the more clogging of the coarse sieve sheet tends to be suppressed.

In a preferred mode of the present manufacturing method, new building raw material is further dropped onto the relay sheet. According to this configuration, the crushing and dispersion through collision with a relay sheet that has no sieve openings and has a large area of contact with the raw material can be performed also on building raw material that is supplied to the sieve portion without passing through the fine sieve sheet, before the building raw material reaches the coarse sieve sheet. Accordingly, the configuration is preferable for suppressing clogging of the coarse sieve sheet.

DESCRIPTION OF EMBODIMENTS

Figure 1:
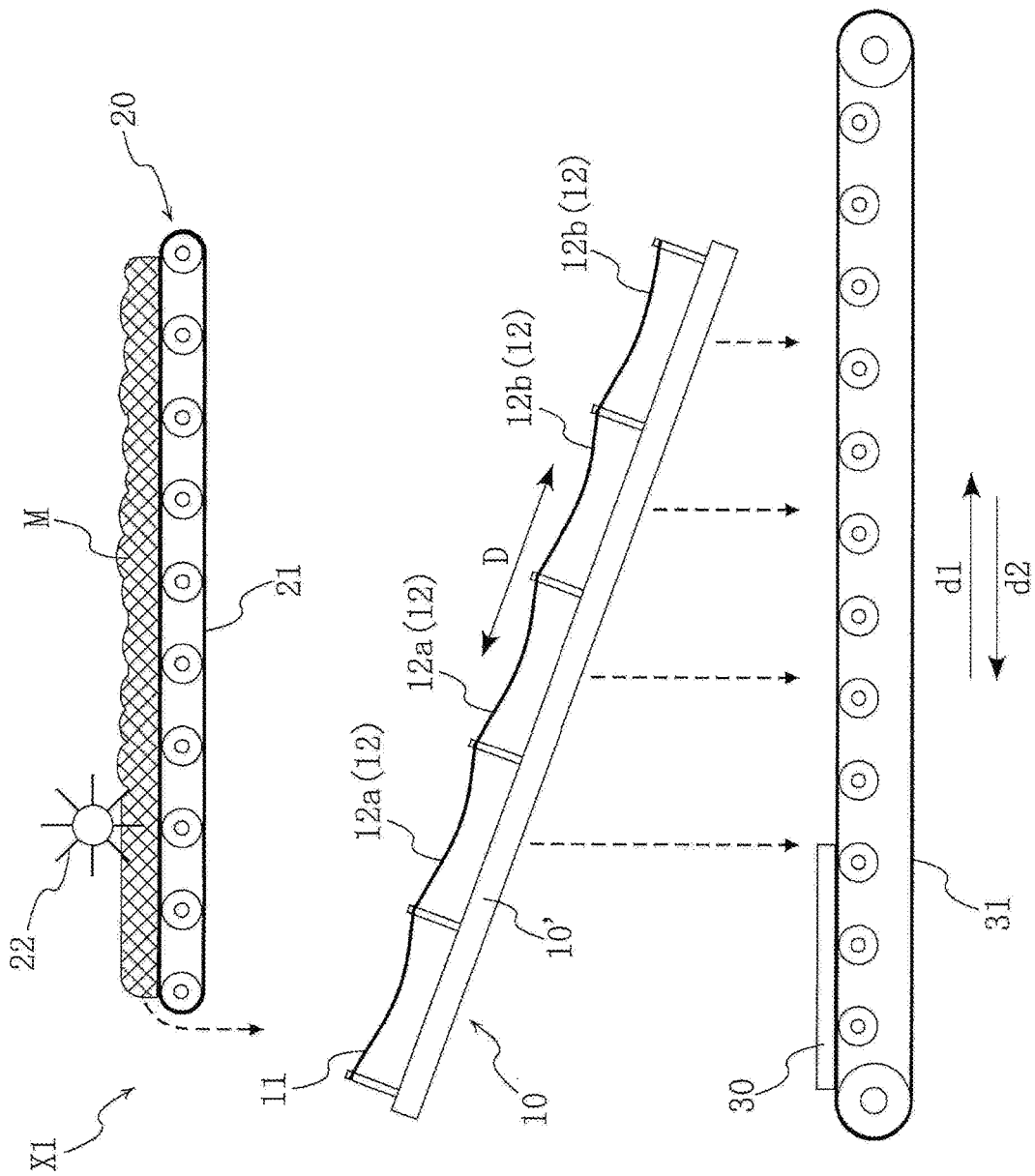
FIG. 1 is a diagram showing a schematic configuration of a building material manufacturing apparatus according to one embodiment of the present invention.

FIG. 1 shows a schematic configuration of a building material manufacturing apparatus X1 according to one embodiment of the present invention. The building material manufacturing apparatus X1 is an apparatus that includes a sieve portion 10, a raw material supplying portion 20, and a receiving tool 30, and can, through accumulation of building raw material of a predetermined size, form a building material mat for forming building material through a heat-pressing step.

The sieve portion 10 includes a series of sheets that can perform undulating motion when the apparatus is running, are inclined, and are arranged side by side in the direction of the inclination, and a main body structure portion 10' to which the series of sheets are attached, and which is for realizing the undulating motion of the sheets. In the present embodiment, the undulating motion of the sheets is motion that has an antinode at which the sheet repeats vibration in its thickness direction, and the smaller the period of the vibration is, the faster the undulating motion is.

The sheet is an elastic sheet that is stretchable, and is preferably a urethane-based rubber sheet. The thickness of the sheet is, for example, 2 to 5 mm. Also, the inclination of the series of sheets in the sieve portion 10 is, for example, 6 to 25 degrees with respect to the horizontal.

The series of sheets in the sieve portion 10 include a receiving and sending sheet 11 that is located on the upper end of the series of sheets, and at least one sieve sheet 12 that is located below the receiving and sending sheet 11. The receiving and sending sheet 11 does not have sieve openings. The sieve sheets 12 have sieve openings. The series of sheets in the sieve portion 10 of the present embodiment include, as the sieve sheets 12, two sieve sheets 12a (fine sieve sheets) with small sieve openings, and two sieve sheets 12b (coarse sieve sheets) with sieve openings that are larger than those of the sieve sheets 12a.

Figure 2:
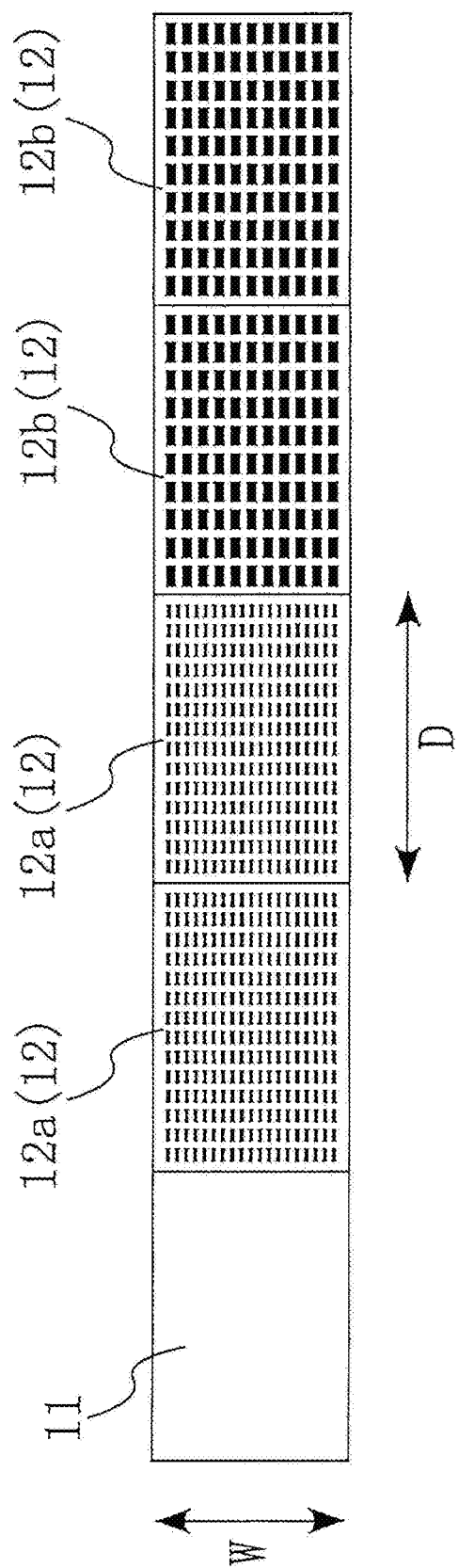
FIG. 2 is a diagram showing a sheet layout in the building material manufacturing apparatus shown in FIG. 1.

FIG. 2 shows the layout of the series of sheets in the present embodiment. In the series of sheets of the present embodiment, the receiving and sending sheet 11, the sieve sheet 12a, the sieve sheet 12a, the sieve sheet 12b, and the sieve sheet 12b are arranged side by side in the stated order, starting from the upper end side. The coarse sieve sheets 12b are located below the fine sieve sheets 12a.

The size of the sieve openings, that is, the opening size, of each of the sieve sheets 12 is, for example, 1 to 50 mm. The size of the sieve openings, that is, the opening size, of each of the sieve sheets 12a is, for example, 1 to 30 mm. The size of the sieve openings, that is, the opening size, of each of the sieve sheets 12b is, for example, 30 to 50 mm.

The above-described main body structure portion 10' includes an inner frame structure body, an outer frame structure body, and an eccentric shaker.

The inner frame structure body includes a pair of inner side boards that extend parallel to each other, and multiple cross beams (first cross beams) that extend in the direction in which the inner side boards are spaced apart from each other, and bridge the space between the inner side boards. Each first cross beam includes a sheet fixing portion on its upper end side.

The outer frame structure body includes a pair of outer side boards that extend in parallel along the inner side boards on the outer sides of the pair of inner side boards, and multiple cross beams (second cross beams) that extend in the direction in which the outer side boards are spaced apart and bridge the space between the outer side boards. Each second cross beam includes a sheet fixing portion on its upper end side.

The inner frame structure body and the outer frame structure body are arranged such that the upper end sides (as well as the sheet fixing portions) of the first cross beams of the inner frame structure body and the upper end sides (as well as the sheet fixing portions) of the second cross beams of the outer frame structure body are arranged alternatingly side by side, parallel to each other, and the outer frame structure body and its pair of outer side boards are hung with support board springs (not shown) from the inner frame structure body and its pair of inner side boards. Also, the inner frame structure body is arranged on a frame (not shown) having a predetermined inclination via vibration-proof rubber (not shown), in a state of accompanying the outer frame structure body in this manner.

The inner frame structure body and the outer frame structure body are joined to the eccentric shaker (not shown) serving as the vibration source, via a driving plate spring (not shown). Specifically, the inner frame structure body and the outer frame structure body are joined to the eccentric shaker via the driving plate spring such that reciprocal motion with a 180-degree phase difference is generated in the inner frame structure body and the outer frame structure body through the rotary motion of the eccentric shaker. The rotation driving speed of the eccentric shaker when the apparatus is running is, for example, 500 to 600 rotations per minute.

Also, each of the above-described series of sheets in the sieve portion 10 is fixed to first and second cross beams that are adjacent to each other. Specifically, each sheet has one edge fixed to a sheet fixing portion of a first cross beam and has another edge fixed to a sheet fixing portion of a second cross beam adjacent to the first cross beam.

Examples of a mechanism for causing undulating motion in the above-described main body structure portion 10' of the sieve portion 10, that is, the series of sheets in the sieve portion 10, include a main body portion of a sieve machine "jumping screen (registered trademark)" manufactured by URAS TECHNO Co., Ltd.

The raw material supplying portion 20 is for supplying the raw material to the sieve portion 10 by dropping the building raw material M onto the receiving and sending sheet 11 in the sieve portion 10, and includes a belt conveyor 21 and a leveling portion 22.

The belt conveyor 21 is for sending the building raw material M to a location above the receiving and sending sheet 11 of the sieve portion 10. The leveling portion 22 is a rotary structure portion for leveling the building raw material M to be sent to the belt conveyor 21, and multiple combing teeth are provided in a standing manner on the rotary circumferential end thereof. In the present embodiment, the leveling portion 22 is arranged such that the rotary circumferential end of the leveling portion 22 opposes the belt conveyor 21 and the rotary axis of the leveling portion 22 is orthogonal to the direction in which the building raw material M is sent by the belt conveyor 21.

From the viewpoint of suppressing or avoiding an increase in the size of the building material manufacturing apparatus X1 and an increase in the overall size of the facility including the building material manufacturing apparatus X1, it is preferable that the raw material supplying portion 20 is arranged above the sieve portion 10 such that the belt conveyor 21 extends along the horizontal component of the layout direction of the series of sheets of the sieve portion 10.

In the present embodiment, the receiving and sending sheet 11 of the above-described sieve portion 10 expands in the same range as the dropping region for the building raw material M dropped from the raw material supplying portion 20 or expands past the dropping region, in the sheet width direction W shown in FIG. 2 (the direction orthogonal to the layout direction D of the sheets).

The receiving tool 30 is for receiving a predetermined building raw material M that has passed through the sieve portion 10, and is placed on a belt conveyor 31 that forms the movement line of the receiving tool 30. The receiving tool 30 moves due to the belt conveyor 31 running.

When the building material manufacturing apparatus X1 is running, the eccentric shaker performs rotary driving in the main body structure portion 10' of the sieve portion 10 to generate reciprocating motion in the inner frame structure body and the outer frame structure body. The phase difference between the reciprocating motions is 180 degrees, as described above. Due to the inner frame structure body and the outer frame structure body performing this reciprocating motion, a state in which each sheet is strongly pulled by the above-described first and second cross beams and a state in which each sheet is relaxed are alternatingly repeated, whereby undulating motion occurs in each sheet. The higher the rotary driving speed of the eccentric shaker is, the faster the undulating motion that occurs in each sheet is as well.

When the building material manufacturing apparatus X1 equipped with the above-described configuration is running, the building raw material M is continuously supplied from a raw material storage portion (not shown) to the raw material supplying portion 20. The building raw material M is prepared according to the building material that is to be manufactured. If the building material to be manufactured is a fiber reinforced cement siding board, the building raw material M may include, for example, a hydraulic material and a reinforcing material, and may include a silicate material, a hollow body, an admixture, a waterproofing agent, or the like.

Examples of the hydraulic material include cement, gypsum, and slag. Examples of cement include normal Portland cement, high early strength Portland cement, alumina cement, blast furnace slag cement, and fly ash cement. Examples of gypsum include calcium sulfate anhydrite, calcium sulfate hemihydrate, and calcium sulfate dihydrate. Examples of slag include blast furnace slag and converter slag.

Examples of the reinforcing material include a plant-based reinforcing material and synthetic fibers. Examples of the plant-based reinforcing material include wood flour, wood wool, wood chips, wood pulp, wood fiber, wood fiber bundles, waste paper, bamboo fiber, hemp fiber, bagasse, chaff, and rice straw. Examples of synthetic fibers include polyester fibers, polyamide fibers, polyethylene fibers, polypropylene fibers, and acrylic fibers.

Examples of the silicate material include silica sand, silica, silica powder, coal ash, fly ash, and diatomaceous earth.

Examples of the hollow body include polystyrene foam beads, microspheres, perlite, fly ash balloons, shirasu balloons, expansible shale, expansive clay, and sintered diatomaceous earth. Examples of microspheres include acrylic foam.

Examples of admixtures include mica, papermaking sludge incineration ash, silica fume, wollastonite, calcium carbonate, magnesium hydroxide, aluminum hydroxide, vermiculite, sepiolite, xonotlite, kaolinite, and zeolite.

Examples of admixtures also include crushed inorganic boards such as fiber reinforced cement siding boards. Examples of crushed inorganic boards also include crushed faulty uncured inorganic plates and crushed faulty cured inorganic boards generated in the process of manufacturing inorganic boards, end materials of inorganic boards generated at a construction site or the like, and crushed discarded materials.

Examples of the waterproofing agent include wax, paraffin, succinic acid, fatty acids, silicone, and synthetic resins. Examples of the synthetic resins include acrylic resins, polyethylene, ethylene-vinyl acetate copolymer, urethane-based resins, and epoxy resins.

The building raw material M supplied to the raw material supplying portion 20 of the building material manufacturing apparatus X1 is sent at, for example, a constant speed to a location above the receiving and sending sheet 11 of the sieve portion 10 by the belt conveyor 21. On the belt conveyor 21, the building raw material M receives a leveling action performed by the rotating leveling portion 22 and its combing teeth.

Then, when the building material manufacturing apparatus X1 is running, in a state in which the series of sheets included in the sieve portion 10 are performing undulating motion, the building raw material M is dropped from the raw material supplying portion 20 onto the receiving and sending sheet 11 of the sieve portion 10 (the route by which the raw material falls from the raw material supplying portion 20 is indicated by a broken line arrow).

Some of the building raw material M dropped from the raw material supplying portion 20 is in the form of bulky clumps. This building raw material M is first received in the sieve portion 10 by the receiving and sending sheet 11, which has no sieve openings and has a large area of contact with the raw material. This configuration is suitable for crushing the building raw material M in the form of bulky clumps through collision with the receiving and sending sheet 11 performing undulating motion before the building raw material M reaches the sieve sheets 12 of the sieve portion 10. The more the crushing of the building raw material M progresses before reaching the sieve sheets 12 of the sieve portion 10, the more clogging of the sieve sheets 12 tends to be suppressed.

In addition to this, the configuration in which the building raw material M dropped from the raw material supplying portion 20 is first received in the sieve portion 10 by the receiving and sending sheet 11, which has no sieve openings and has a large area of contact with the raw material, is suitable for dispersing the building raw material M in, for example, a sheet width direction W due to collision with the receiving and sending sheet 11 that performs undulating motion, before the building raw material M reaches the sieve sheets 12 of the sieve portion 10. The more the building raw material M is dispersed before reaching the sieve sheets 12 of the sieve portion 10, the more clogging of the sieve sheets 12 tends to be suppressed.

When the building material manufacturing apparatus X1 is running, the building raw material M that has undergone the above-described crushing and dispersion on the receiving and sending sheet 11 that performs undulating motion travels down the series of sheets that are inclined, including the receiving and sending sheet 11, and specifically, moves from the receiving and sending sheet 11 to the sieve sheets 12 and undergoes sieving by the sieve sheet 12 with sieve openings (the sheets continue the undulating motion when the apparatus is running). Then, the portion of the building raw material M that is generated due to the sieving in the sieve portion 10 and has passed through the sieve openings of the sieve sheets 12 (the portion of the building raw material M that has passed through the sieve openings of the sieve sheets 12) is accumulated on the receiving tool 30, whereby a raw material mat is formed (the routes by which the raw material falls from the sieve portion 10 are indicated by broken line arrows). According to the building material manufacturing apparatus X1, it is possible to form, for example, a raw material mat with a two-layer structure by obtaining a granularity-dispersed raw material with two segments from the building raw material M through the above-described sieving. Specifics are as follows.

Figure 3:
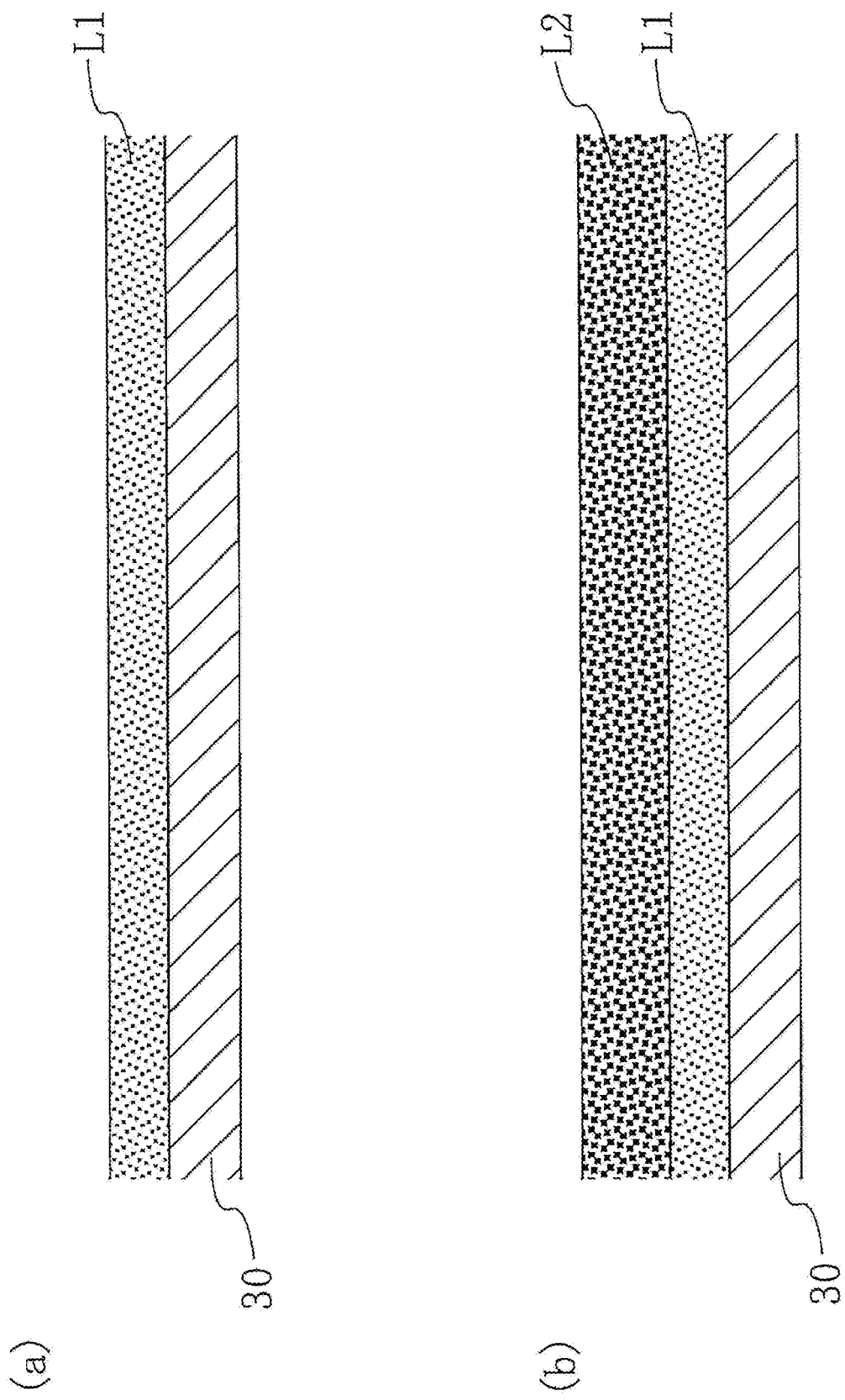
FIG. 3 shows a partial cross-sectional view of a state of layer formation of a mat on a receiving tool in the building material manufacturing apparatus shown in FIG. 1.

First, a predetermined amount of the portion of the building raw material M that has passed through the sieve openings of the sieve sheets 12a (portion of the building raw material M that has passed through the sieve openings of the sieve sheets 12a) is accumulated on the receiving tool 30, which has been transported in the arrow d1 direction by the belt conveyor 31 and is passing directly below the sieve sheets 12a of the sieve portion 10. Accordingly, a layer L1 (first layer) formed due to the accumulation of the relatively fine building raw material M that has passed through the fine sieve sheet 12a is formed on the receiving tool 30 as shown in FIG. 3(a). The receiving tool 30 is, for example, a mold plate having an uneven shape corresponding to a design surface of the building material to be manufactured on its inner surface (surface on the side that receives the building raw material M).

Then, a predetermined amount of the portion of the building raw material M that has passed through the sieve openings of the sieve sheets 12b (portion of the building raw material M that has passed through the sieve openings of the sieve sheets 12b) is accumulated on the layer L1 on the receiving tool 30 that has been transported in the arrow d1 direction by the belt conveyor 31 and is passing directly below the sieve sheet 12b of the sieve portion 10. Accordingly, a layer L2 (second layer) formed due to the accumulation of the relatively coarse building raw material M that has passed through the coarse sieve sheets 12b is formed on the layer L1 as shown in FIG. 3(b).

Thereafter, heat-pressing is performed on the stacked body of the layers L1 and L2 (heat pressing step). In the present step, the pressing pressure is, for example, 2 to 8 MPa, the heating temperature is, for example, 50 to 80° C., and the pressing time is 6 to 12 hours. Thereafter, autoclave curing is performed as needed. In this autoclave curing, the temperature condition is, for example, 150° C. or more, and the pressure condition is, for example, 0.5 MPa or more.

Building material having a stacked structure with a cured layer formed using the layer L1 and a cured layer formed using the layer L2 is manufactured by subjecting the stacked body of the layers L1 and L2 to the heat-pressing step, or to the heat-pressing step and then autoclave curing. For example, if the building material to be manufactured is a fiber reinforced cement siding board and the above-described building raw material M includes a water-curable material, a silicate material, and a reinforcing material, each cured layer has a structure in which the reinforcing material is dispersed in an inorganic curing matrix formed from the hydraulic material and the silicate material.

Since the cured layer formed from the layer L1, which is an accumulation of the relatively fine building raw material M, has a finer structure, it is suitable for obtaining a higher water resistance, and thus is suitable for forming an outer layer of the building material. Since the cured layer formed from the layer L2, which is an accumulation of the relatively coarse building raw material M, has a lower-density and lighter structure, it is suitable for obtaining a high cushion property, and thus is suitable for forming a core layer of the building material.

As described above, the building material manufacturing apparatus X1 is suitable for manufacturing the building material while suppressing clogging of the sieve sheets 12 in the sieve portion 10 for sieving the building raw material M. Suppression of clogging of the sieve sheets 12 is suitable for reducing the amount of time and labor needed for maintenance of the sieve sheets 12 and the sieve portion 10, and thus is suitable from the viewpoint of suppressing the cost of manufacturing the building material.

In the above-described conventional building material manufacturing apparatus including the sieve portion that performs sieving through winnowing, the above-described air blower for blowing the air to the building raw material is relatively large, and thus an increase in the size of the apparatus for manufacturing the building material and an increase in the size of the facility are likely to be incurred. Also, the implementation of sieving through winnowing in the sieve portion requires frequent cleaning of the apparatus and the facility for manufacturing the building material.

In contrast to this, since the building material manufacturing apparatus X1 does not require an air blower, it is preferable for avoiding an increase in the size of the apparatus and an increase in the size of the facility for manufacturing the building material, and thus is preferable from the viewpoint of suppressing the cost of manufacturing the building material. Also, since sieving through winnowing in the sieve portion 10 is not required, the building material manufacturing apparatus X1 is preferable for avoiding frequent cleaning of the apparatus and the facility for manufacturing the building material and suppressing the cost of manufacturing the building material.

As described above, the building material manufacturing apparatus X1 is suitable for manufacturing the building material efficiently in terms of the manufacturing cost and the like while suppressing clogging of the sieve sheets 12 in the sieve portion 10 for sieving the building raw material M.

As described above, in the sheet width direction W, the receiving and sending sheet 11 expands in the same range as the drop region of the building raw material M dropped from the raw material supplying portion 20, or expands past the drop region.

This configuration is preferable for suitably receiving all of the building raw material M supplied from the raw material supplying portion 20 on the sieve portion 10 and the receiving and sending sheet 11. Also, the configuration in which the receiving and sending sheet 11 is wider than the raw material dropping region is suitable for dispersing the building raw material M in the sheet width direction W through collision with the receiving and sending sheet 11 that is performing undulating motion, before the building raw material M reaches the sieve sheet 12 of the sieve portion 10. The more the building raw material M is dispersed before reaching the sieve sheets 12 of the sieve portion 10, the more clogging of the sieve sheets 12 tends to be suppressed.

As described above, the raw material supplying portion 20 includes the belt conveyor 21 for sending the building raw material M above the receiving and sending sheet 11 of the sieve portion 10, and the leveling portion 22 for leveling the building raw material M sent on the belt conveyor 21.

This configuration is preferable for suppressing clogging of the sieve sheet 12 of the sieve portion 10. Specifically, the leveling action performed by the leveling portion 22 on the building raw material M sent on the belt conveyor 21 of the raw material supplying portion 20 is suitable for evening out the supply flow rate of the building raw material M that is supplied by being dropped from the terminal end of the belt conveyor 21 onto the receiving and sending sheet 11, and thus is preferable for suppressing clogging of the sieve sheets 12 by suppressing deviation of the building raw material M on the series of sheets in the sieve portion 10.

Figure 4:
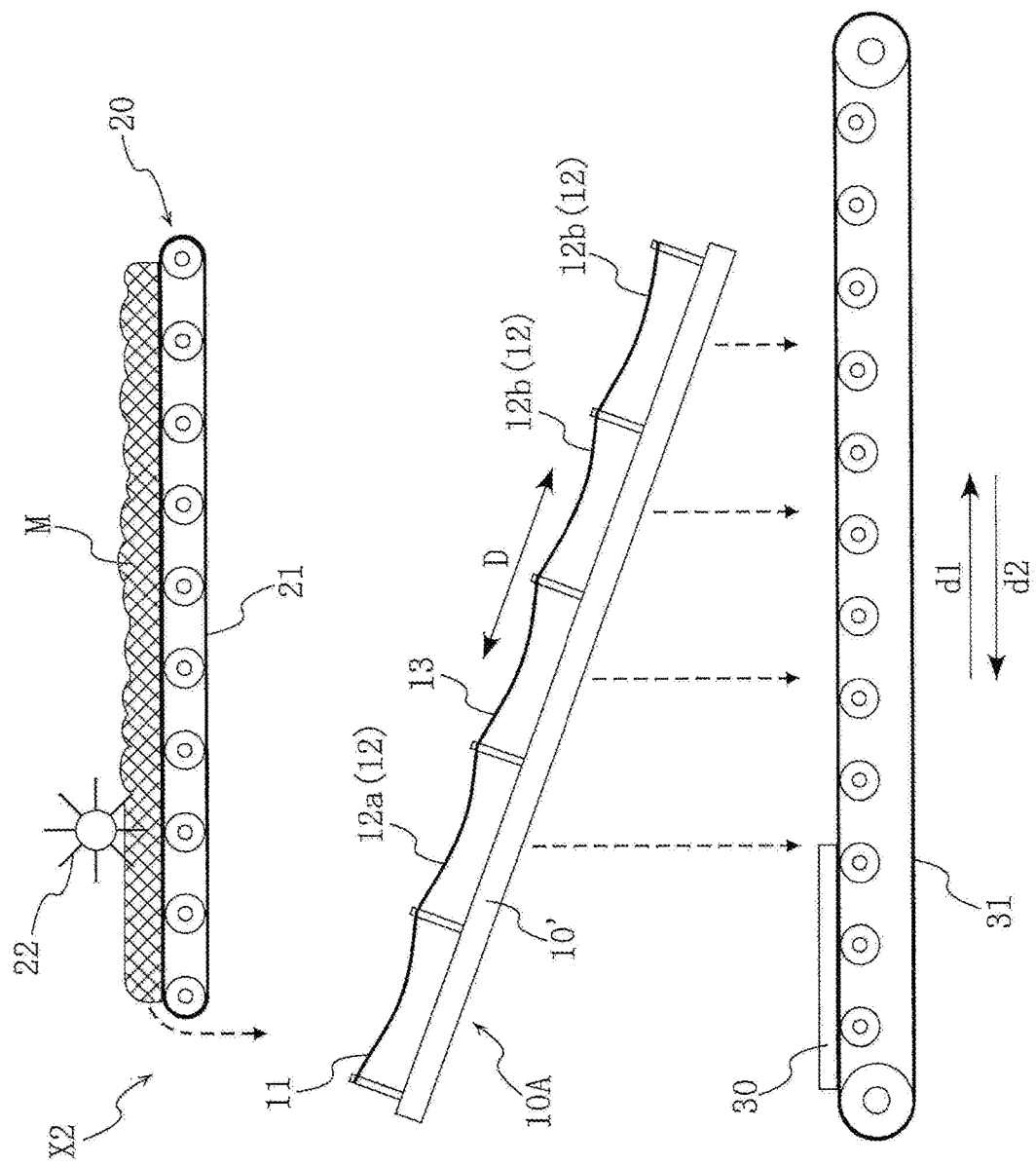
FIG. 4 is a diagram showing a schematic configuration of a building material manufacturing apparatus according to one embodiment of the present invention.

FIG. 4 shows a schematic configuration of a building material manufacturing apparatus X2 according to one embodiment of the present invention. The building material manufacturing apparatus X2 includes a sieve portion 10A, the above-described raw material supplying portion 20, and the above-described receiving tool 30, and differs from the above-described building material manufacturing apparatus X1 in that it includes the sieve portion 10A instead of the sieve portion 10.

The sieve portion 10A includes a series of sheets that can perform undulating motion when the apparatus is running, are inclined, and are arranged side by side in the direction of the inclination, and the above-described main body structure portion 10' to which the series of sheets are attached, and which is for realizing the undulating motion of the sheets.

Figure 5:
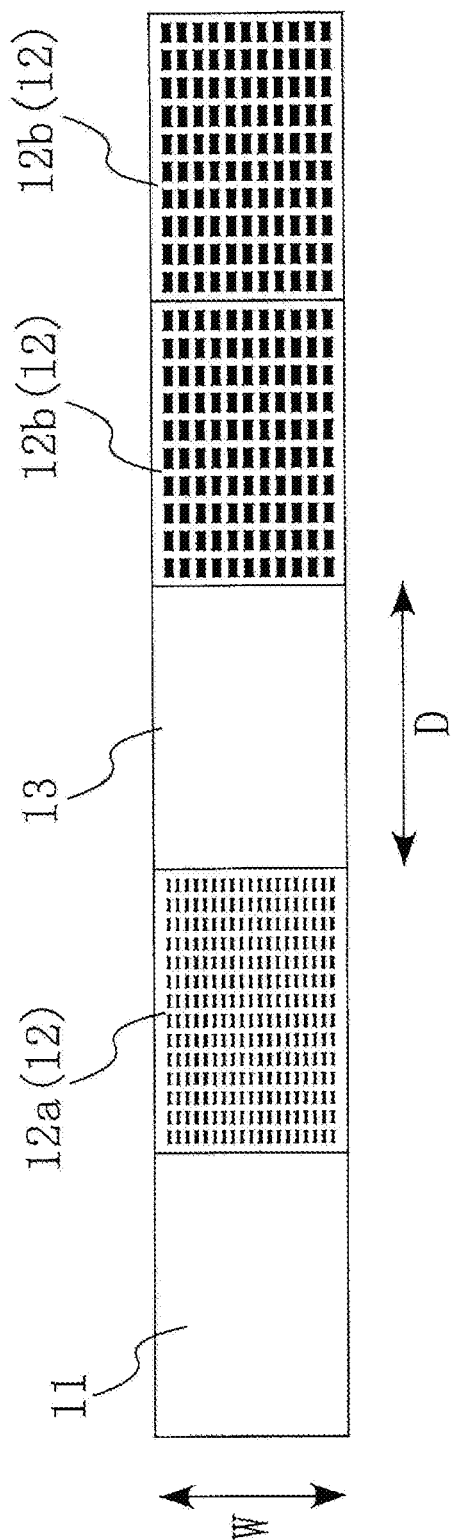
FIG. 5 is a diagram showing a sheet layout in the building material manufacturing apparatus shown in FIG. 4.

The sieve portion 10A differs from the sieve portion 10 in that it includes a series of sheets in the layout shown in FIG. 5, instead of the series of sheets in the layout described above with reference to FIG. 2. The series of sheets of the sieve portion 10A include the receiving and sending sheet 11 with no sieve openings, two types of sieve sheets 12a and 12b as sieve sheets 12 with sieve openings, and a relay sheet 13 with no sieve openings. The coarse sieve sheets 12b are located below the fine sieve sheet 12a. Also, the relay sheet 13 is arranged between the fine sieve sheet 12a and the coarse sieve sheet 12b.

When the building material manufacturing apparatus X1 equipped with the above-described configuration is running, the building raw material M is continuously supplied to the raw material supplying portion 20 from a raw material storage unit (not shown), and the building raw material M is sent at, for example, a constant speed to a location above the receiving and sending sheet 11 of the sieve portion 10A by the belt conveyor 21. On the belt conveyor 21, the building raw material M receives a leveling action performed by the rotating leveling portion 22 and its combing teeth.

Then, in a state in which each of the series of sheets of the sieve portion 10A are performing undulating motion, the building raw material M is dropped from the raw material supplying portion 20 to the receiving and sending sheet 11 of the sieve portion 10A (the route by which the raw material falls from the raw material supplying portion 20 is indicated by a broken line arrow).

Some of the building raw material M dropped from the raw material supplying portion 20 are in the form of bulky clumps. This building raw material M is first received in the sieve portion 10A by the receiving and sending sheet 11, which has no sieve openings and has a large area of contact with the raw material. This configuration is suitable for crushing the building raw material M in the form of bulky clumps through collision with the receiving and sending sheet 11 performing undulating motion before the building raw material M reaches the sieve sheets 12 of the sieve portion 10A. The more the crushing of the building raw material M progresses before reaching the sieve sheets 12 of the sieve portion 10A, the more clogging of the sieve sheets 12 tends to be suppressed.

In addition to this, the configuration in which the building raw material M dropped from the raw material supplying portion 20 is first received in the sieve portion 10A by the receiving and sending sheet 11, which has no sieve openings and has a large area of contact with the raw material, is suitable for dispersing the building raw material M in, for example, a sheet width direction W due to collision with the receiving and sending sheet 11 that performs undulating motion before the building raw material M reaches the sieve sheets 12 of the sieve portion 10A. The more the building raw material M is dispersed before reaching the sieve sheets 12 of the sieve portion 10A, the more clogging of the sieve sheets 12 tends to be suppressed.

When the building material manufacturing apparatus X1 is running, the building raw material M that has undergone the above-described crushing and dispersion on the receiving and sending sheet 11 that performs undulating motion travels down the series of sheets that are inclined, including the receiving and sending sheet 11, and specifically, moves from the receiving and sending sheet 11 to the sieve sheets 12 and undergoes sieving by the sieve sheets 12 with sieve openings (the sheets continue the undulating motion when the apparatus is running).

Also, the building raw material M that does not pass through the sieve openings of the sieve sheet 12a in the sieving in the fine sieve sheet 12a of the sieve portion 10A is subjected to crushing and dispersion through collision with the relay sheet 13, which has no sieve openings and has a large area of contact with the raw material before reaching the coarse sieve sheets 12b. The building raw material M that does not pass through the sieve openings of the sieve sheet 12a moves onto the coarse sieve sheets 12b via the relay sheet 13 in this manner. The more the crushing of the building raw material M progresses and the more the building raw material M is dispersed before reaching the sieve sheets 12b, the more clogging of the sieve sheets 12b tends to be suppressed.

Then, the portion of the building raw material M that was generated through sieving by the sieve portion 10A and has passed through the sieve openings of the sieve sheets is accumulated on the receiving tool 30, and thus a raw material mat is formed (the routes by which the raw material falls from the sieve portion 10A are indicated by broken line arrows). According to the building material manufacturing apparatus X2, it is possible to form, for example, a raw material mat with a two-layer structure by obtaining a granularity-dispersed raw material with two segments from the building raw material M through the above-described sieving. Specifics are as follows.

Figure 6:
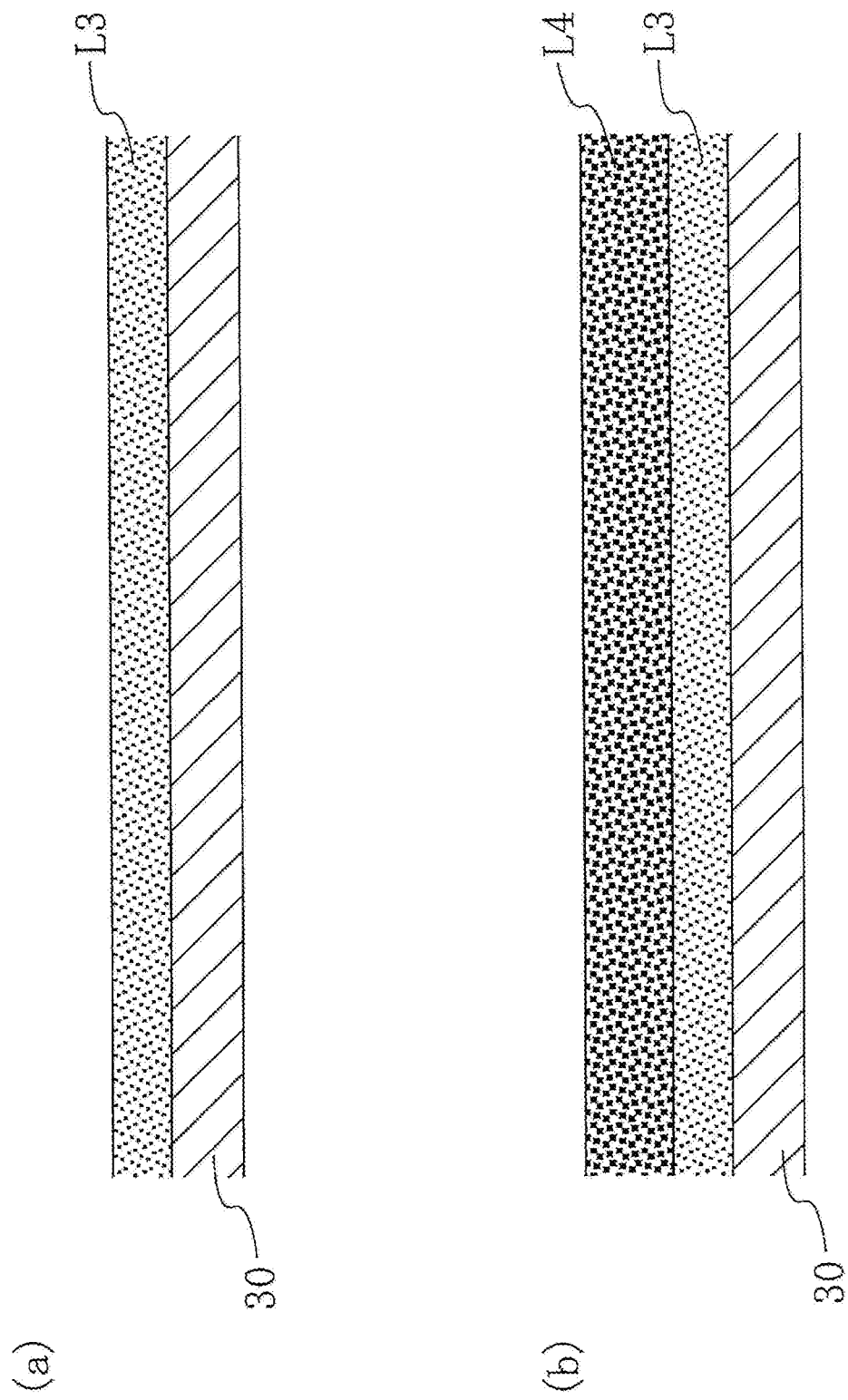
FIG. 6 shows a partial cross-sectional view of a state of layer formation of a mat on a receiving tool in the building material manufacturing apparatus shown in FIG. 4.

First, a predetermined amount of the portion of the building raw material M that has passed through the sieve openings of the sieve sheet 12a is accumulated on the receiving tool 30 that has been transported in the arrow d1 direction by the belt conveyor 31 and is passing directly below the sieve sheet 12a of the sieve portion 10A. Accordingly, a layer L3 (first layer) formed due to the accumulation of the relatively fine building raw material M that has passed through the fine sieve sheet 12a is formed on the receiving tool 30 as shown in FIG. 6(a). The receiving tool 30 is, for example, a mold plate having an uneven shape corresponding to a design surface of the building material to be manufactured on its inner surface (surface on the side that receives the building raw material M).

Then, a predetermined amount of the portion of the building raw material M that has passed through the sieve openings of the sieve sheets 12b is accumulated on the layer L3 of the receiving tool 30 that has been transported in the arrow d1 direction by the belt conveyor 31 and is passing directly below the sieve sheets 12b of the sieve portion 10A. Accordingly, a layer L4 (second layer) formed due to the accumulation of the relatively coarse building raw material M that has passed through the coarse sieve sheet 12b is formed on the layer L3 as shown in FIG. 6(b).

Thereafter, the stacked body with the layers L3 and L4 is subjected to the above-described heat-pressing step, or the above-described heat-pressing step and then autoclave curing. Building material having a stacked structure with a cured layer formed using the layer L3 and a cured layer formed using the layer L4 is manufactured by subjecting the stacked body with the layers L3 and L4 to the heat-pressing step, or to the heat-pressing step and then autoclave curing.

The cured layer formed from the layer L3, which is an accumulation of the relatively fine building raw material M, has a finer structure, and therefore is suitable for obtaining a higher water resistance, and thus is suitable for forming an outer layer of the building material. The cured layer formed from the layer L4, which is an accumulation of the relatively coarse building raw material M, has a lower density and lighter structure, and therefore is suitable for obtaining a high cushion property, and thus is suitable for forming a core layer of the building material.

As described above, the building material manufacturing apparatus X2 is suitable for manufacturing the building material while suppressing clogging of the sieve sheets 12 in the sieve portion 10A for sieving the building raw material M. Suppression of clogging of the sieve sheets 12 is suitable for reducing the amount of time and labor needed for maintenance of the sieve sheets 12 and the sieve portion 10A, and thus is suitable from the viewpoint of suppressing the cost of manufacturing the building material.

Also, for reasons similar to those described above regarding the building material manufacturing apparatus X1, the building material manufacturing apparatus X2 is preferable for avoiding an increase in the size of the apparatus and an increase in the size of the facility for manufacturing the building material, is also preferable for avoiding frequent cleaning of the apparatus and the facility for manufacturing the building material, and thus is preferable for suppressing the cost of manufacturing the building material.

As described above, the building material manufacturing apparatus X2 is suitable for manufacturing the building material efficiently in terms of the manufacturing cost and the like while suppressing clogging of the sieve sheets 12 in the sieve portion 10A for sieving the building raw material M.

According to the building material manufacturing apparatus X2, a raw material mat with another two-layer structure can also be formed as follows.

Figure 7:
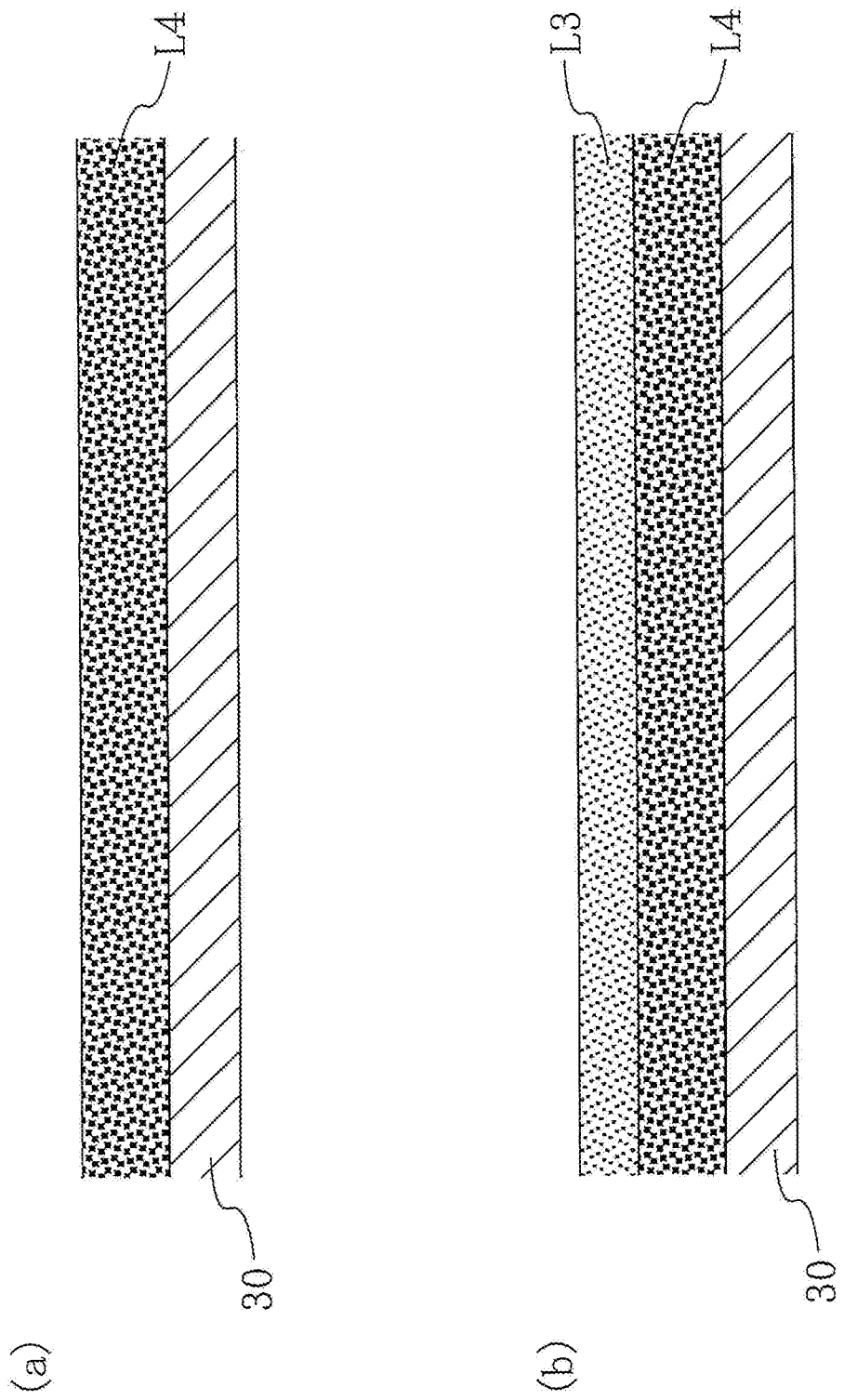
FIG. 7 shows a partial cross-sectional view of another state of layer formation of a mat on a receiving tool in the building material manufacturing apparatus shown in FIG. 4.

First, a predetermined amount of the portion of the building raw material M that has passed through the sieve openings of the sieve sheet 12b is accumulated on the receiving tool 30, which has been transported in the arrow d2 direction from the right end in the drawing of the belt conveyor 31 by the belt conveyor 31 and is passing directly below the sieve sheets 12b of the sieve portion 10A. Accordingly, a layer L4 (first layer) formed due to the accumulation of the relatively coarse building raw material M that has passed through the coarse sieve sheet 12b is formed on the receiving tool 30 as shown in FIG. 7(a). The receiving tool 30 is a flat board with an inner surface (surface on the side that receives the building raw material M) that does not have an uneven shape.

Then, a predetermined amount of the portion of the building raw material M that has passed through the sieve openings of the sieve sheet 12a is accumulated on the layer L4 of the receiving tool 30 that has been transported in the arrow d2 direction by the belt conveyor 31 and is passing directly below the sieve sheet 12a of the sieve portion 10A. Accordingly, a layer L3 (second layer) formed due to the accumulation of the relatively fine building raw material M that has passed through the fine sieve sheet 12a is formed on the layer L4 as shown in FIG. 7(b).

Thereafter, the stacked body of the layers L3 and L4 is subjected to the above-described heat-pressing step, or the above-described heat-pressing step and then autoclave curing. Building material having a stacked structure with a cured layer formed using the layer L3 and a cured layer formed using the layer L4 is manufactured by subjecting the stacked body of the layers L3 and L4 to the heat-pressing step, or to the heat-pressing step and then autoclave curing.

According to the building material manufacturing apparatus X2, a raw material mat with a three-layer structure can also be formed by obtaining a granularity-distributed raw material with two segments from the building raw material M through the above-described sieving. Specifics are as follows.

Figure 8:
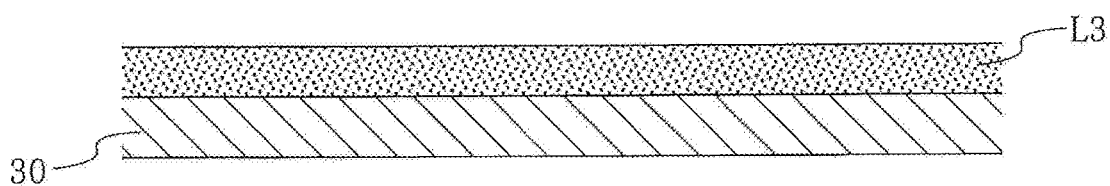
FIG. 8 shows a partial cross-sectional view of another state of layer formation of a mat on a receiving tool in the building material manufacturing apparatus shown in FIG. 4.
Figure 8:
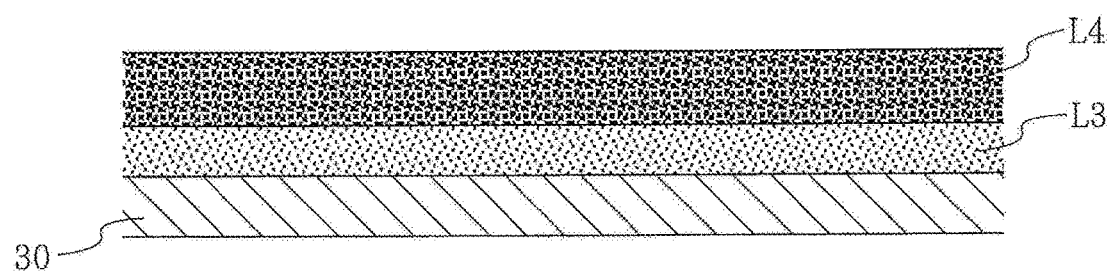
Figure 8:
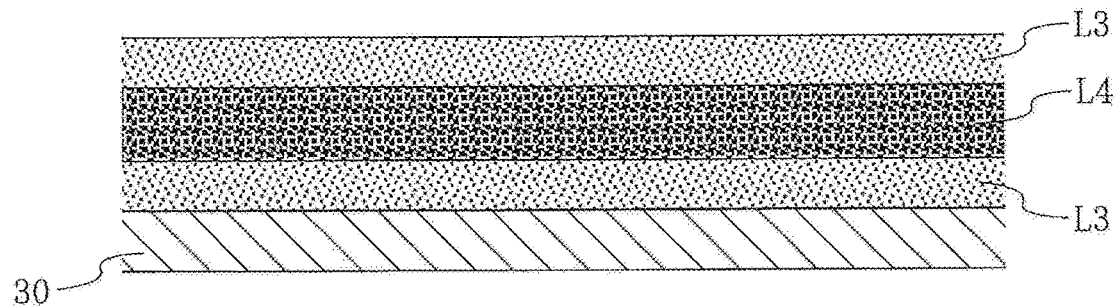

First, a predetermined amount of the portion of the building raw material M that has passed through the sieve openings of the sieve sheet 12a is accumulated on the receiving tool 30 that has been transported by the belt conveyor 31 in the arrow d1 direction from the left end in the drawing of the belt conveyor 31 and is passing directly below the sieve sheet 12a of the sieve portion 10A. Accordingly, a layer L3 (first layer) formed due to the accumulation of the relatively fine building raw material M that has passed through the fine sieve sheet 12a is formed on the receiving tool 30 as shown in FIG. 8(a). The receiving tool 30 is, for example, a mold plate having an uneven shape corresponding to a design surface of the building material to be manufactured on its inner surface (surface on the side that receives the building raw material M).

Next, a predetermined amount of the portion of the building raw material M that has passed through the sieve openings of the sieve sheets 12b is accumulated on the receiving tool 30 that has been transported by the belt conveyor 31 and is passing directly below the sieve sheets 12b of the sieve portion 10A (the period of passing directly below the sieve sheets 12b includes a period of being transported in the arrow d1 direction by the belt conveyor 31 to pass directly below the sieve sheets 12b, and a period of being transported in the arrow d2 direction to pass directly below the sieve sheets 12b after the movement direction is reversed by the belt conveyor 31 on the right end in the drawing of the belt conveyor 31). Accordingly, a layer L4 (second layer) formed due to the accumulation of the relatively coarse building raw material M that has passed through the coarse sieve sheets 12b is formed on the layer L3 as shown in FIG. 8(b).

Then, a predetermined amount of the portion of the building raw material M that has passed through the sieve openings of the sieve sheet 12a is accumulated on the receiving tool 30 that has been transported in a movement direction that has been reversed to the arrow d2 direction by the belt conveyor 31 and is passing directly below the sieve sheet 12a of the sieve portion 10A. Accordingly, the layer L3 (third layer) formed due to the accumulation of the relatively fine building raw material M that has passed through the fine sieve sheet 12a is formed on the layer L4 as shown in FIG. 8(c).

Thereafter, the stacked body with the layers L3, L4, and L3 is subjected to the above-described heat-pressing step, or the above-described heat-pressing step and then autoclave curing. A building material having a stacked structure with two cured layers formed from the layers L3 and a cured layer that is located between the cured layers and is formed from the layer L4 is manufactured by subjecting the stacked body with the layers L3, L4, and L3 to a heat-pressing step, or a heat-pressing step and then autoclave curing.

As described above, the cured layer formed from the layer L3, which is an accumulation of the relatively fine building raw material M, has a finer structure, and therefore is suitable for obtaining a higher water resistance, and thus is suitable for forming an outer layer of the building material. As described above, the cured layer formed from the layer L4, which is an accumulation of the relatively coarse building raw material M, has an even lower density and lighter structure, and therefore is suitable for obtaining a high cushion property, and thus is suitable for forming a core layer of the building material.

The building material manufacturing apparatus X2 is also able to manufacture the building material with the three-layer structure as described above while suppressing clogging of the sieve sheets 12 in the sieve portion 10A for sieving the building raw material M.

Figure 9:
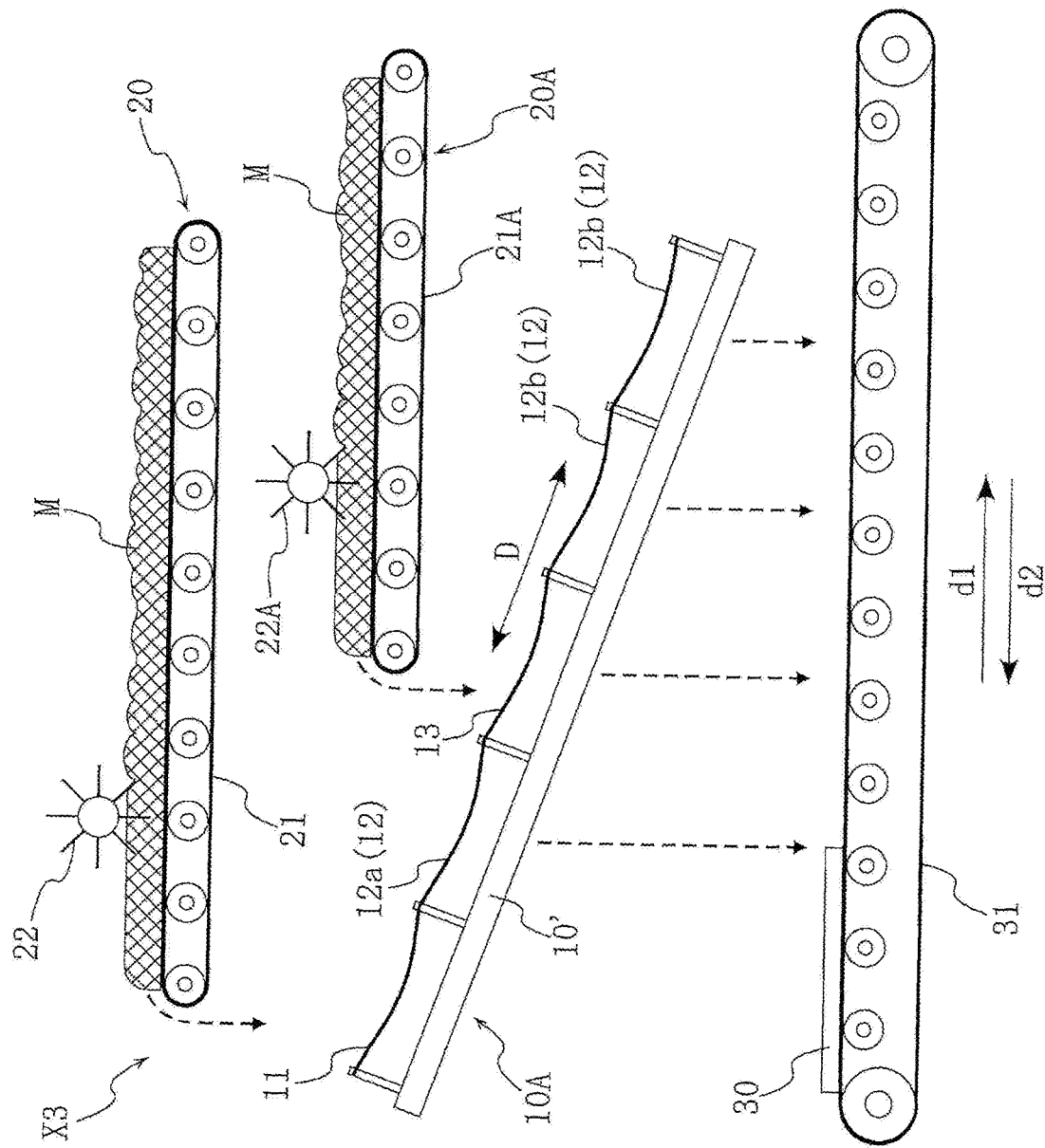
FIG. 9 is a diagram showing a schematic configuration of a building material manufacturing apparatus according to one embodiment of the present invention.

FIG. 9 shows a schematic configuration of a building material manufacturing apparatus X3 according to one embodiment of the present invention. The building material manufacturing apparatus X3 includes the above-described sieve portion 10A having the series of sheets with the layout configuration shown in FIG. 5, the above-described raw material supplying portion 20, a raw material supplying portion 20A, and the above-described receiving tool 30. The building material manufacturing apparatus X3 differs from the above-described building material manufacturing apparatus X1 in that it includes the sieve portion 10A instead of the sieve portion 10, and in that it further includes the raw material supplying portion 20A.

The raw material supplying portion 20A is for supplying the raw material to the sieve portion 10A by dropping additional building raw material M onto the relay sheet 13 in the sieve portion 10A, and includes a belt conveyor 21A and a leveling portion 22A. In the present embodiment, the building raw material M supplied from the raw material supplying portion 20A has a greater powder size and is coarser than the building raw material M supplied from the raw material supplying portion 20. The building raw material M supplied from the raw material supplying portion 20A and the building raw material M supplied from the raw material supplying portion 20 may also have the same structure or different structures.

The belt conveyor 21A is for sending the building raw material M to a location above the relay sheet 13 of the sieve portion 10A. The leveling portion 22A is a rotary structure portion for leveling the building raw material M to be sent to the belt conveyor 21A, and multiple combing teeth are provided in a standing manner on the rotary circumferential end thereof. In the present embodiment, the leveling portion 22 is arranged such that the rotary circumferential end of the leveling portion 22A opposes the belt conveyor 21A and the rotary axis of the leveling portion 22A is orthogonal to the direction in which the building raw material M is sent by the belt conveyor 21A.

From the viewpoint of suppressing or avoiding an increase in the size of the building material manufacturing apparatus X3 and an increase in the overall size of the facility including the building material manufacturing apparatus X3, it is preferable that the raw material supplying portion 20A is arranged above the sieve portion 10A such that the belt conveyor 21A extends along the horizontal component of the layout direction of the series of sheets of the sieve portion 10A.

In the present embodiment, in the sheet width direction W shown in FIG. 5 (the direction orthogonal to the sheet layout direction D), the relay sheet 13 in the sieve portion 10A expands in the same range as the drop region of the building raw material M dropped from the raw material supplying portion 20A, or expands past the drop region.

When the building material manufacturing apparatus X3 equipped with the above-described configuration is running, the building raw material M is continuously supplied to the raw material supplying portion 20 from a raw material storage unit (not shown), and the building raw material M is sent at, for example, a constant speed to a location above the receiving and sending sheet 11 of the sieve portion 10A by the belt conveyor 21. On the belt conveyor 21, the building raw material M receives a leveling action performed by the rotating leveling portion 22 and its combing teeth.

Then, in a state in which each of the series of sheets of the sieve portion 10A are performing undulating motion, the building raw material M is dropped from the raw material supplying portion 20 to the receiving and sending sheet 11 of the sieve portion 10A (the route by which the raw material falls from the raw material supplying portion 20 is indicated by a broken line arrow).

The building raw material M supplied from the raw material supplying portion 20 is subjected to crushing and dispersion by the receiving and sending sheet 11 that performs undulating motion in the sieve portion 10A, similarly to the building raw material M described above relating to the building material manufacturing apparatus X2. The building raw material M that does not pass through the sieve openings of the sieve sheet 12a in the sieving with the fine sieve sheet 12a in the sieve portion 10A is subjected to crushing and dispersion by the relay sheet 13 that performs undulating motion, similarly to the building raw material M described above relating to the building material manufacturing apparatus X2. Accordingly, clogging of the sieve sheet 12 is suppressed.

Also, when the building material manufacturing apparatus X3 is running, additional building raw material M is continuously supplied from another raw material storage portion (not shown) to the raw material supplying portion 20A, and the building raw material M is sent at, for example, a constant speed to a location above the relay sheet 13 of the sieve portion 10A by the belt conveyor 21A. On the belt conveyor 21A, the building raw material M receives a leveling action performed by the rotating leveling portion 22A and its combing teeth.

Then, in a state in which each of the series of sheets of the sieve portion 10A is performing undulating motion, the additional building raw material M is dropped from the raw material supplying portion 20A onto the relay sheet 13 of the sieve portion 10A (the route by which the raw material falls from the raw material supplying portion 20A is indicated by a broken line arrow). The building raw material M dropped from the raw material supplying portion 20A to the sieve portion 10A is added on the relay sheet 13 to the building raw material M that does not pass through the sieve openings of the sieve sheet 12a after being dropped from the raw material supplying portion 20 to the sieve portion 10A.

Some of the building raw material M dropped from the raw material supplying portion 20A is in the form of bulky clumps. This building raw material M is first received in the sieve portion 10A by the relay sheet 13, which has no sieve openings and has a large area of contact with the raw material. This configuration is suitable for crushing the building raw material M in the form of bulky clumps through collision with the relay sheet 13 performing undulating motion before the building raw material M reaches the sieve sheets 12b of the sieve portion 10A. The more the crushing of the building raw material M progresses before reaching the sieve sheets 12b of the sieve portion 10A, the more clogging of the sieve sheets 12b tends to be suppressed.

In addition to this, the configuration in which the building raw material M dropped from the raw material supplying portion 20A is first received in the sieve portion 10A by the relay sheet 13, which has no sieve openings and has a large area of contact with the raw material, is suitable for dispersing the building raw material M in, for example, the sheet width direction W through collision with the relay sheet 13 that performs undulating motion, before the building raw material M reaches the sieve sheets 12b of the sieve portion 10A. The more the building raw material M is dispersed before reaching the sieve sheets 12b of the sieve portion 10A, the more clogging of the sieve sheets 12b tends to be suppressed.

When the building material manufacturing apparatus X3 is running, the building raw material M supplied from the raw material supplying portion 20 is subjected to sieving by the sieve portion 10A after being crushed and dispersed on the receiving and sending sheet 11, and the building raw material M supplied from the raw material supplying portion 20A is subjected to sieving by the sieve portion 10A after being crushed and dispersed on the relay sheet 13 (the sheets continue to perform undulating motion).

Then, the portion of the building raw material M that was generated through sieving by the sieve portion 10A and has passed through the sieve openings of the sieve sheets is accumulated on the receiving tool 30, and thus a raw material mat is formed (the routes by which the raw material falls from the sieve portion 10A are indicated by broken line arrows). According to the building material manufacturing apparatus X3, it is possible to form, for example, a raw material mat with a two-layer structure by obtaining a granularity-dispersed raw material with two segments from the building raw material M through the above-described sieving. Specifics are as follows.

Figure 10:
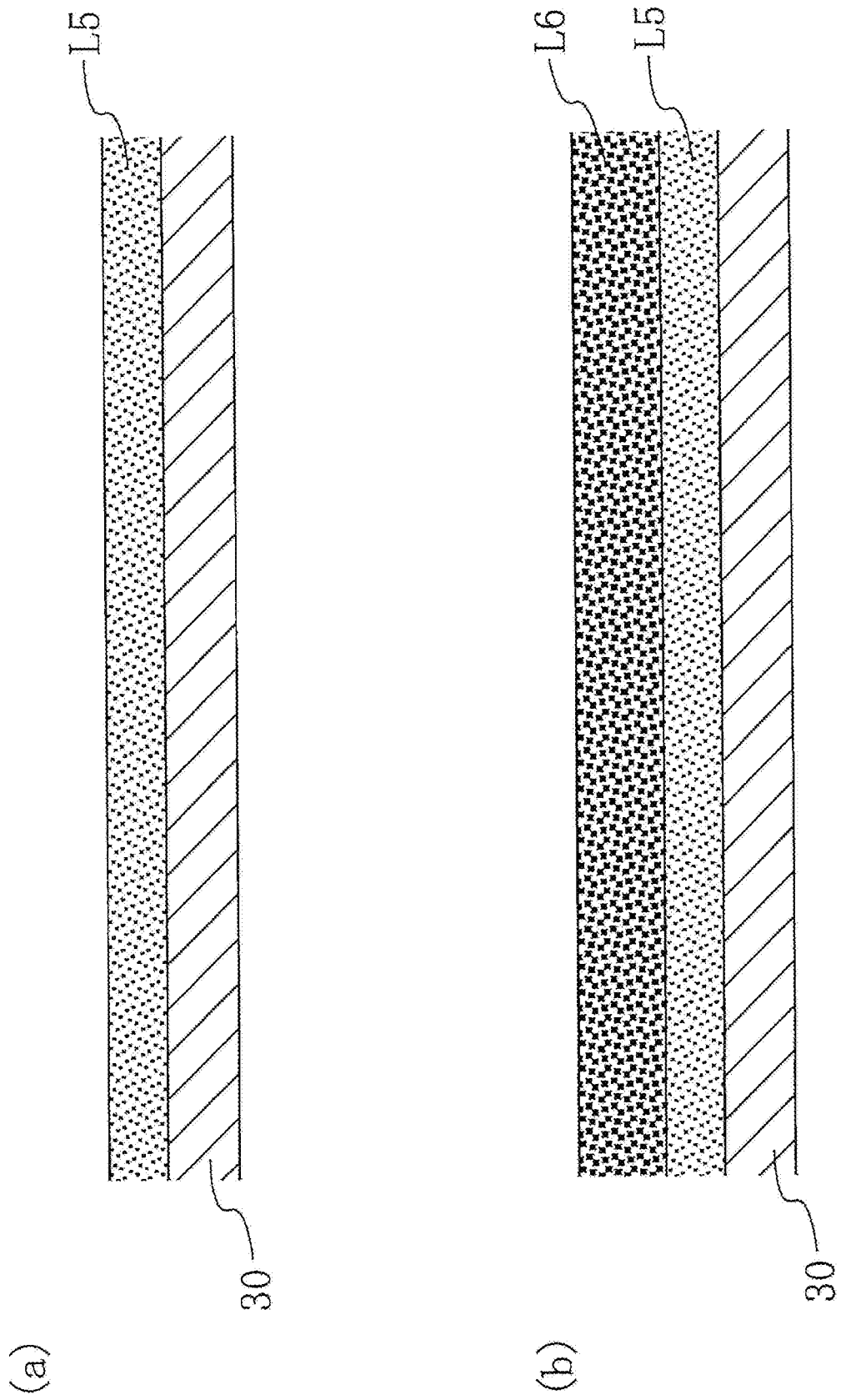
FIG. 10 shows a partial cross-sectional view of a state of layer formation of a mat on a receiving tool of the building material manufacturing apparatus shown in FIG. 9.

First, a predetermined amount of the portion of the building raw material M that has passed through the sieve openings of the sieve sheet 12a is accumulated on the receiving tool 30 that has been transported in the arrow d1 direction by the belt conveyor 31 and is passing directly below the sieve sheet 12a of the sieve portion 10A. Accordingly, a layer L5 (first layer) formed due to the accumulation of the relatively fine building raw material M that has passed through the fine sieve sheet 12a is formed on the receiving tool 30 as shown in FIG. 10(a). The receiving tool 30 is, for example, a mold plate having an uneven shape corresponding to a design surface of the building material to be manufactured on its inner surface (surface on the side that receives the building raw material M).

Then, a predetermined amount of the portion of the building raw material M that has passed through the sieve openings of the sieve sheets 12b is accumulated on the layer L5 of the receiving tool 30 that has been transported in the arrow d1 direction by the belt conveyor 31 and is passing directly below the sieve sheets 12b of the sieve portion 10A. Accordingly, a layer L6 (second layer) formed due to the accumulation of the relatively coarse building raw material M that has passed through the coarse sieve sheets 12b is formed on the layer L5 as shown in FIG. 10(b).

Thereafter, the stacked body with the layers L5 and L6 is subjected to the above-described heat-pressing step, or the above-described heat-pressing step and then autoclave curing. Building material having a stacked structure with a cured layer formed using the layer L5 and a cured layer formed using the layer L6 is manufactured by subjecting the stacked body of the layers L5 and L6 to the heat-pressing step, or to the heat-pressing step and then autoclave curing.

The cured layer formed from the layer L5, which is an accumulation of the relatively fine building raw material M, has a finer structure, and therefore is suitable for obtaining a higher water resistance, and thus is suitable for forming an outer layer of the building material. The cured layer formed from the layer L6, which is an accumulation of the relatively coarse building raw material M, has a lower-density and lighter structure, and therefore is suitable for obtaining a high cushion property, and thus is suitable for forming a core layer of the building material.

As described above, the building material manufacturing apparatus X3 is suitable for manufacturing the building material while suppressing clogging of the sieve sheets 12 in the sieve portion 10A for sieving the building raw material M. Suppression of clogging of the sieve sheets 12 is suitable for reducing the amount of time and labor needed for maintenance of the sieve sheets 12 and the sieve portion 10A, and thus is suitable from the viewpoint of suppressing the cost of manufacturing the building material.

Also, for reasons similar to those described above regarding the building material manufacturing apparatuses X1 and X2, the building material manufacturing apparatus X3 is preferable for avoiding an increase in the size of the apparatus and an increase in the size of the facility for manufacturing the building material, is preferable for avoiding frequent cleaning of the apparatus and the facility for manufacturing the building material, and thus is preferable for suppressing the cost of manufacturing the building material.

Figure 11:
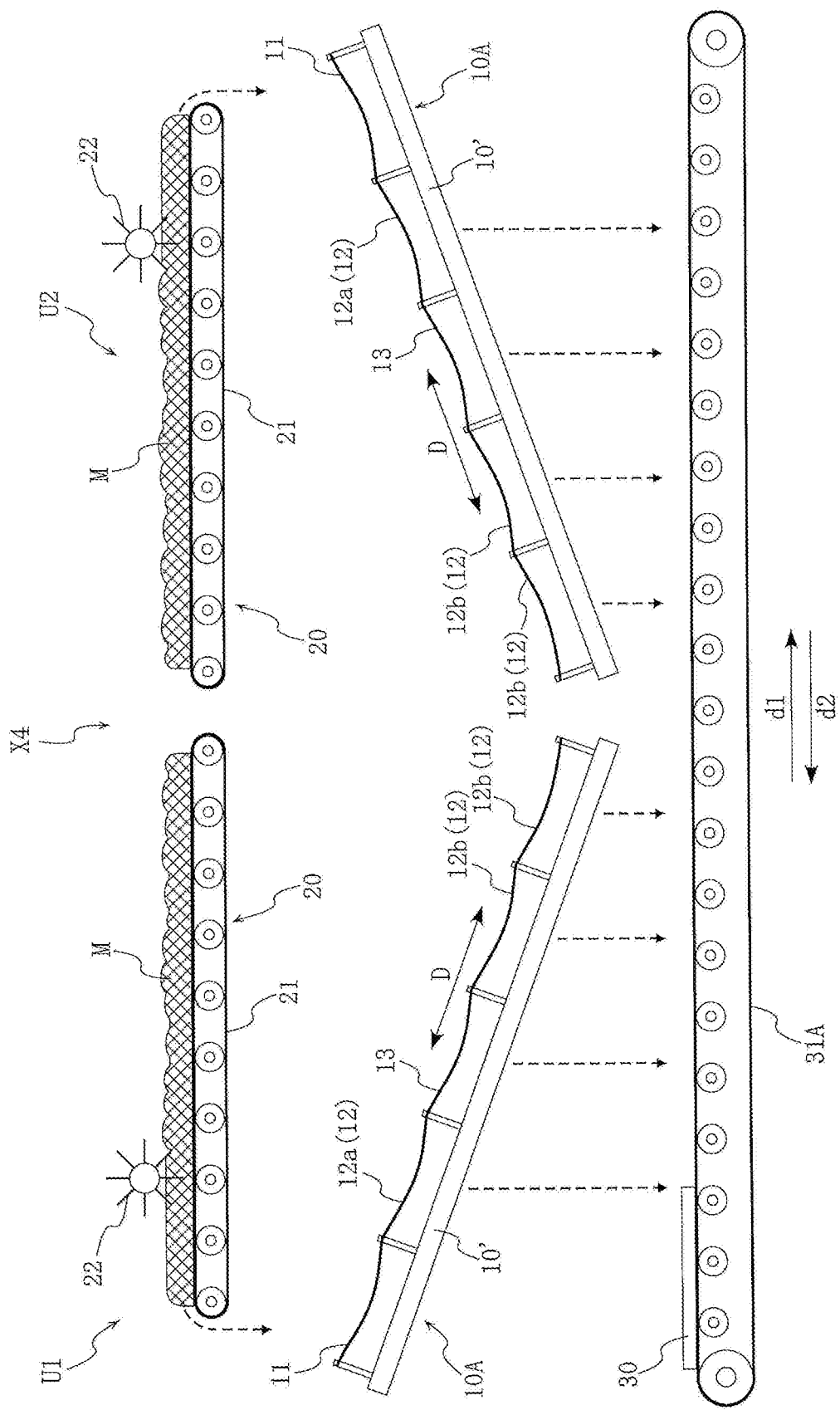
FIG. 11 is a diagram showing a schematic configuration of the building material manufacturing apparatus according to one embodiment of the present invention.

FIG. 11 shows a schematic configuration of a building material manufacturing apparatus X4 according to one embodiment of the present invention. The building material manufacturing apparatus X4 includes a unit U1, a unit U2, and the receiving tool 30.

The units U1 and U2 respectively include the sieve portion 10A and the raw material supplying portion 20. As described above, the sieve portion 10A includes a series of sheets that can perform undulating motion when the apparatus is running, are inclined, and are aligned in the direction of the inclination, and a main body structure portion 10' to which the series of sheets are attached, and which is for realizing the undulating motion of the sheets.

In the present embodiment, the series of sheets in the sieve portion 10A of the unit U2 are aligned on the extended region in the layout direction D of the series of sheets in the sieve portion 10A of the unit U1. Also, in the series of sheets of the sieve portion 10A of the unit U1 the closer a sheet is to the unit U2, the lower it is located, and in the series of sheets of the sieve portion 10A of the unit U2, the closer a sheet is to the unit U1, the lower it is located.

Figure 12:
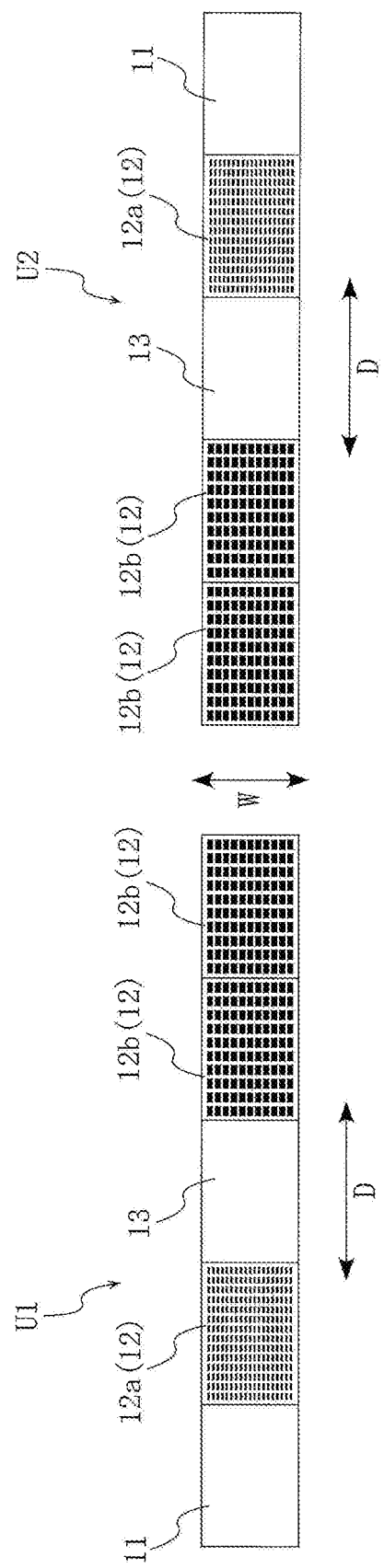
FIG. 12 is a diagram showing a sheet layout in the building material manufacturing apparatus shown in FIG. 11.

The series of sheets in the sieve portion 10A include the receiving and sending sheet 11 with no sieve openings, two types of sieve sheets 12a and 12b as sieve sheets 12 with sieve openings, and a relay sheet 13 with no sieve openings that is located between the sieve sheets 12a and 12b. The sheet layout configuration in the building material manufacturing apparatus X4 and the units U1 and U2 is shown in FIG. 12.

In the building material manufacturing apparatus X4, in the series of sheets of the unit U1, the receiving and sending sheet 11 is arranged spaced farther apart from the series of sheets of the unit U2 than the sieve sheets 12a and 12b. On the other hand, in the series of sheets of the unit U2, the receiving and sending sheet 11 is arranged spaced farther apart from the series of sheets of the unit U1 than the sieve sheets 12a and 12b.

In the present embodiment, the receiving tool 30 is for receiving a predetermined building raw material M that has passed through the sieve portions 10A of the units U1 and U2, and is arranged on a belt conveyor 31A that forms the movement line of the receiving tool 30. Due to the belt conveyor 31A running, the receiving tool 30 moves, and the receiving tool 30 is configured to be able to move in the region spanning between the region in which the building raw material M that has passed through the sieve portion 10A of the unit U1 can be received and the region in which the building raw material M that has passed through the sieve portion 10A of the unit U2 can be received.

When this building material manufacturing apparatus X4 is running, in each of the units U1 and U2, the building raw material M is continuously supplied from the raw material storage portion (not shown) to the raw material supplying portion 20, and the building raw material M is sent at, for example, a constant speed to a location above the receiving and sending sheet 11 of the sieve portion 10A by the belt conveyor 21. On the belt conveyor 21, the building raw material M receives a leveling action performed by the rotating leveling portion 22 and its combing teeth.

Then, in each unit, in a state in which the series of sheets of the sieve portion 10A are performing undulating motion, the building raw material M is dropped from the raw material supplying portion 20 onto the receiving and sending sheet 11 of the sieve portion 10A (the route by which the raw material falls from the raw material supplying portion 20 is indicated by a broken line arrow).

In each unit, the building raw material M supplied from the raw material supplying portion 20 is subjected to crushing and dispersion by the receiving and sending sheet 11 that performs undulating motion in the sieve portion 10A, similarly to the building raw material M described above relating to the building material manufacturing apparatus X2. In each unit, the building raw material M that does not pass through the sieve openings of the sieve sheet 12a in the sieving with the fine sieve sheet 12a in the sieve portion 10A is subjected to crushing and dispersion by the relay sheet 13 that performs undulating motion, similarly to the building raw material M described above relating to the building material manufacturing apparatus X2. Accordingly, clogging of the sieve sheets 12 is suppressed.

Then, when the building material manufacturing apparatus X4 is running, the portion of the building raw material M that is generated through the sieving in the sieve portion 10A of the unit U1 and passes through the sieve openings of the sieve sheets can form a layer that is to be a raw material mat, and the portion of the building raw material M that is generated through the sieving in the sieve portion 10A of the unit U2 and passes through the sieve openings of the sieve sheets can form the layer that is to be a raw material mat (the routes by which the raw material falls from each sieve portion 10A are indicated by broken line arrows). Specifics are as follows.

Figure 13:
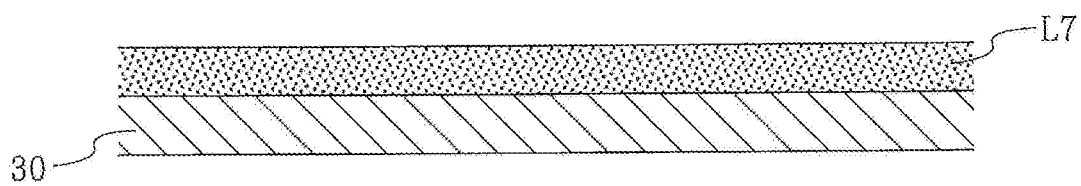
FIG. 13 shows a partial cross-sectional view of a state of layer formation of a mat on a receiving tool of the building material manufacturing apparatus shown in FIG. 12.
Figure 13:
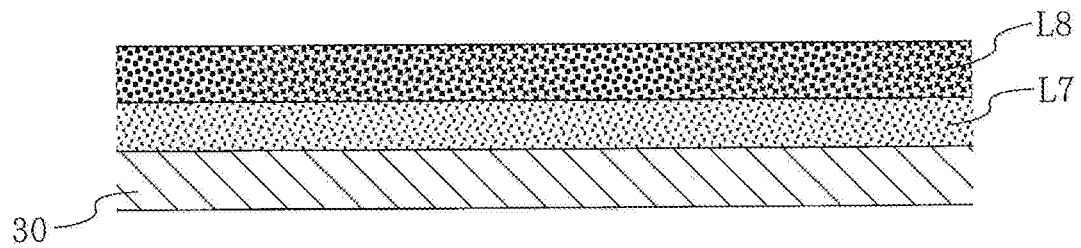
Figure 13:
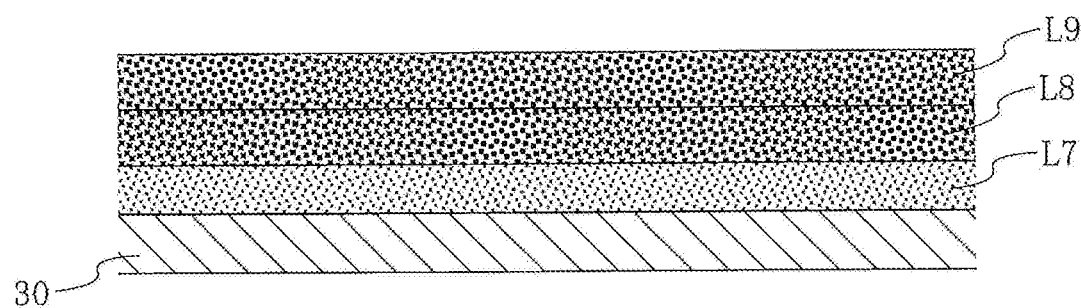
Figure 13:
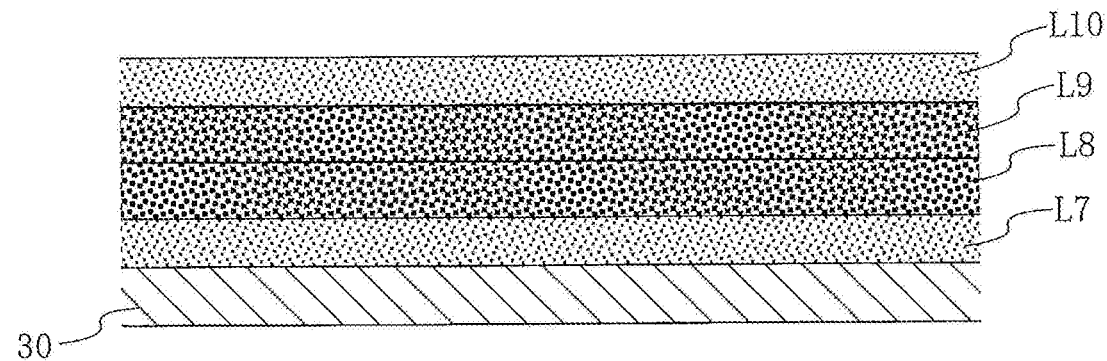

First, a predetermined amount of the portion of the building raw material M that has passed through the sieve openings of the sieve sheet 12a is accumulated on the receiving tool 30 that has been transported in the arrow d1 direction by the belt conveyor 31A and is passing directly below the sieve sheet 12a of the sieve portion 10A of the unit U1 Accordingly, a layer L7 (first layer) formed due to the accumulation of the relatively fine building raw material M that has passed through the fine sieve sheet 12a is formed on the receiving tool 30 as shown in FIG. 13(a). The receiving tool 30 is, for example, a mold plate having an uneven shape corresponding to a design surface of the building material to be manufactured on its inner surface (surface on the side that receives the building raw material M).

Next, a predetermined amount of the portion of the building raw material M that has passed through the sieve openings of the sieve sheets 12b is accumulated on the layer L7 on the receiving tool 30 that has been transported in the arrow d1 direction by the belt conveyor 31A and is passing directly below the sieve sheets 12b of the sieve portion 10A of the unit U1. Accordingly, a layer L8 (second layer) formed due to the accumulation of the relatively coarse building raw material M that has passed through the coarse sieve sheets 12b is formed on the layer L7 as shown in FIG. 13(b).

Next, a predetermined amount of the portion of the building raw material M that has passed through the sieve openings of the sieve sheets 12b is accumulated on the layer L8 on the receiving tool 30 that has been transported in the arrow d1 direction by the belt conveyor 31A and is passing directly below the sieve sheets 12b of the sieve portion 10A of the unit U2. Accordingly, a layer L9 (third layer) formed due to the accumulation of the relatively coarse building raw material M that has passed through the coarse sieve sheets 12b is formed on the layer L8 as shown in FIG. 13(c).

Next, a predetermined amount of the portion of the building raw material M that has passed through the sieve openings of the sieve sheet 12a is accumulated on the layer L9 on the receiving tool 30 that has been transported in the arrow d1 direction by the belt conveyor 31A and is passing directly below the sieve sheet 12a of the sieve portion 10A of the unit U2. Accordingly, a layer L10 (fourth layer) formed due to the accumulation of the relatively fine building raw material M that has passed through the fine sieve sheet 12a is formed on the layer L9 as shown in FIG. 13(d).

Thereafter, the stacked body with the layers L7, L8, L9, and L10 is subjected to the above-described heat-pressing step, or the above-described heat-pressing step and then autoclave curing. A building material with a stacked structure including cured layers formed from the layers is manufactured due to the stacked body with the layers L7, L8, L9, and L10 being subjected to a heat-pressing step, or being subjected to a heat-pressing step and then autoclave curing.

The cured layers formed from the layers L7 and L10, which are accumulations of the relatively fine building raw material M, have a finer structure, and therefore are suitable for obtaining a higher water resistance, and thus are suitable for forming outer layers of the building material. The cured layers formed from the layers L8 and L9, which are accumulations of the relatively coarse building raw material M, have a lower density and lighter structures, and therefore are suitable for obtaining a high cushion property, and thus are suitable for forming a core layer of the building material.

As described above, the building material manufacturing apparatus X4 is suitable for manufacturing the building material while suppressing clogging of the sieve sheets 12 in the sieve portion 10A for sieving the building raw material M. Suppression of clogging of the sieve sheets 12 is suitable for reducing the amount of time and labor needed for maintenance of the sieve sheets 12 and the sieve portion 10A, and thus is suitable from the viewpoint of suppressing the cost of manufacturing the building material.

Also, for reasons similar to those described above regarding the building material manufacturing apparatuses X1 and X2, the building material manufacturing apparatus X4 is preferable for avoiding an increase in the size of the apparatus and an increase in the size of the facility for manufacturing the building material, is preferable for avoiding frequent cleaning of the apparatus and the facility for manufacturing the building material, and thus is preferable for suppressing the cost of manufacturing the building material.

Figure 14:
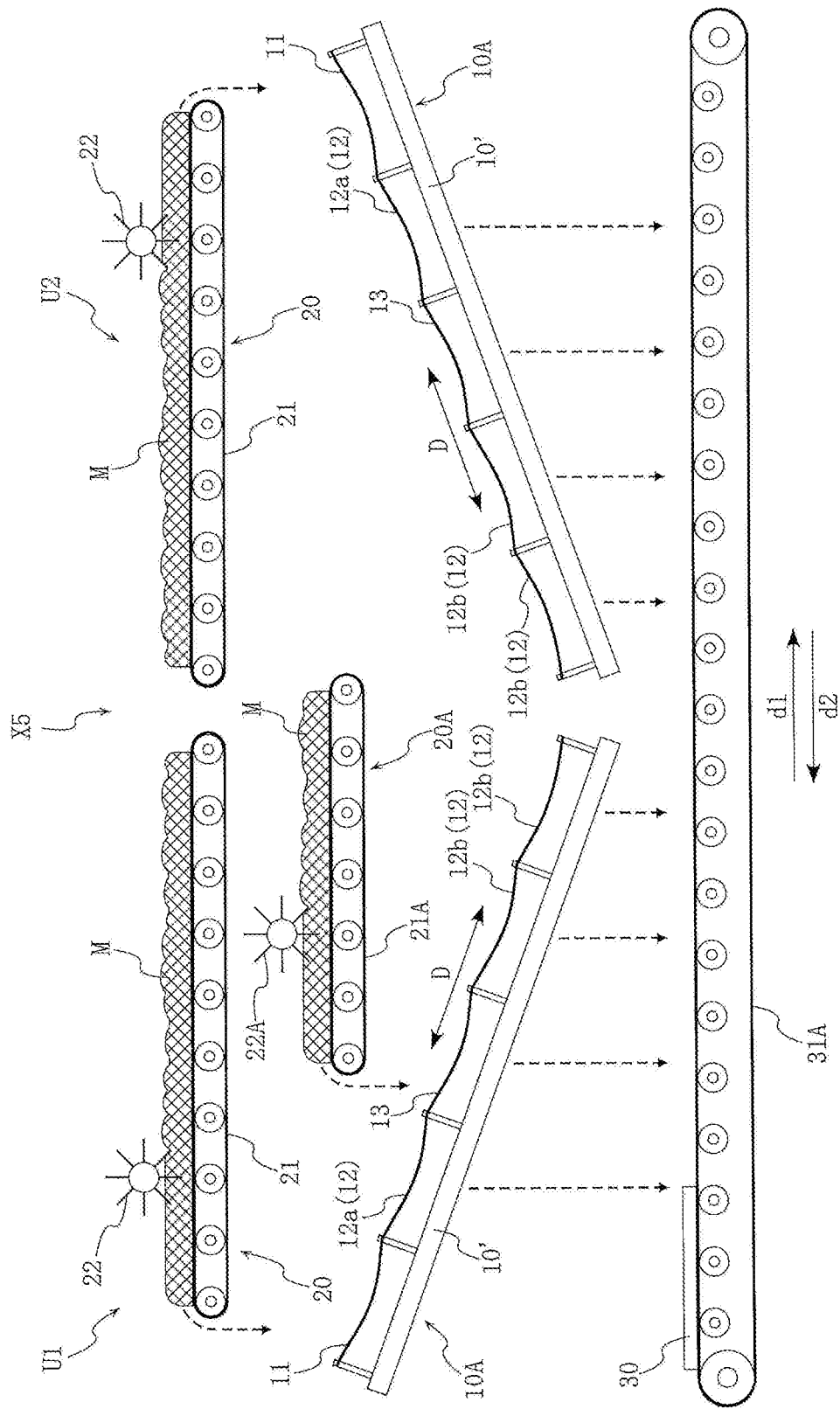
FIG. 14 is a diagram showing a schematic configuration of the building material manufacturing apparatus according to one embodiment of the present invention.

FIG. 14 shows a schematic configuration of a building material manufacturing apparatus X5 according to one embodiment of the present invention. The building material manufacturing apparatus X5 includes a unit U1, a unit U2, and the receiving tool 30. The unit U1 of the building material manufacturing apparatus X5 includes the sieve portion 10A, the raw material supplying portion 20, and a raw material supplying portion 20A, and differs from the unit U1 of the building material manufacturing apparatus X4 in that it further includes the raw material supplying portion 20A. The unit U2 and the receiving tool 30 of the building material manufacturing apparatus X5 have the same configurations as the unit U2 and the receiving tool 30 of the building material manufacturing apparatus X4.

In the present embodiment, the raw material supplying portion 20A is for supplying the raw material to the sieve portion 10A by dropping additional building raw material M onto the relay sheet 13 in the sieve portion 10A in the unit U1, and the raw material supplying portion 20A includes the belt conveyor 21A and the leveling portion 22A. In the present embodiment, the building raw material M supplied from the raw material supplying portion 20A has a greater powder size and is coarser than the building raw material M supplied from the raw material supplying portion 20. The building raw material M supplied from the raw material supplying portion 20A and the building raw material M supplied from the raw material supplying portion 20 may also have the same structure or different structures.

The belt conveyor 21A is for sending the building raw material M above the relay sheet 13 of the sieve portion 10A in the unit U1. The leveling portion 22A is a rotary structure portion for leveling the building raw material M to be sent to the belt conveyor 21A, and multiple combing teeth are provided in a standing manner on the rotary circumferential end thereof. In the present embodiment, the leveling portion 22 is arranged such that the rotary circumferential end of the leveling portion 22A opposes the belt conveyor 21A and the rotary axis of the leveling portion 22A is orthogonal to the direction in which the building raw material M is sent by the belt conveyor 21A.

From the viewpoint of suppressing or avoiding an increase in the size of the building material manufacturing apparatus X5 and an increase in the overall size of the facility including the building material manufacturing apparatus X5, it is preferable that the raw material supplying portion 20A is arranged above the sieve portion 10A such that the belt conveyor 21A extends along the horizontal component of the layout direction of the series of sheets in the sieve portion 10A of the unit U1.

In the present embodiment, in the sheet width direction W shown in FIG. 12 (direction orthogonal to the layout direction D of the sheets), the relay sheet 13 in the sieve portion 10A of the unit U1 expands in the same range as the drop region of the building raw material M dropped from the raw material supplying portion 20A or expands past the drop region.

When this building material manufacturing apparatus X5 is running, in each of the units U1 and U2, the building raw material M is continuously supplied from the raw material storage portion (not shown) to the raw material supplying portion 20, and the building raw material M is sent at, for example, a constant speed to a location above the receiving and sending sheet 11 of the sieve portion 10A by the belt conveyor 21. On the belt conveyor 21, the building raw material M receives a leveling action performed by the rotating leveling portion 22 and its combing teeth.

Then, in each unit, in a state in which the series of sheets of the sieve portion 10A are performing undulating motion, the building raw material M is dropped from the raw material supplying portion 20 onto the receiving and sending sheet 11 of the sieve portion 10A (the route by which the raw material falls from the raw material supplying portion 20 is indicated by a broken line arrow).

In each unit, the building raw material M supplied from the raw material supplying portion 20 is subjected to crushing and dispersion by the receiving and sending sheet 11 that performs undulating motion in the sieve portion 10A, similarly to the building raw material M described above relating to the building material manufacturing apparatus X2. In each unit, the building raw material M that does not pass through the sieve openings of the sieve sheet 12a in the sieving with the fine sieve sheet 12a in the sieve portion 10A is subjected to crushing and dispersion by the relay sheet 13 that performs undulating motion, similarly to the building raw material M described above relating to the building material manufacturing apparatus X2. Accordingly, clogging of the sieve sheet 12 is suppressed.

Also, when the building material manufacturing apparatus X5 is running, additional building raw material M is continuously supplied from another raw material storage portion (not shown) to the raw material supplying portion 20A of the unit U1, and the building raw material M is sent at, for example, a constant speed to a location above the relay sheet 13 of the sieve portion 10A by the belt conveyor 21A. On the belt conveyor 21A, the building raw material M receives a leveling action performed by the rotating leveling portion 22A and its combing teeth.

Then, in a state in which the series of sheets of the sieve portion 10A in the unit U1 perform undulating motion, the additional building raw material M is dropped from the raw material supplying portion 20A onto the relay sheet 13 of the sieve portion 10A (the route by which the raw material falls from the raw material supplying portion 20A is indicated by a broken line arrow). The building raw material M dropped from the raw material supplying portion 20A onto the sieve portion 10A in the unit U1 is added on the relay sheet 13 to the building raw material M that does not pass through the sieve openings of the sieve sheet 12a after being dropped from the raw material supplying portion 20 onto the sieve portion 10A.

Some of the building raw material M dropped from the raw material supplying portion 20A is in the form of bulky clumps. This building raw material M is first received in the sieve portion 10A of the unit U1 by the relay sheet 13, which has no sieve openings and has a large area of contact with the raw material. This configuration is suitable for crushing the building raw material M in the form of bulky clumps through collision with the relay sheet 13 that is performing undulating motion, before the building raw material M reaches the sieve sheet 12b of the sieve portion 10A in the unit U1. The more the crushing of the building raw material M progresses before reaching the sieve sheets 12b of the sieve portion 10A, the more clogging of the sieve sheets 12b tends to be suppressed.

In addition to this, the configuration in which the building raw material M dropped from the raw material supplying portion 20A is first received in the sieve portion 10A of the unit U1 by the relay sheet 13, which has no sieve openings and has a large area of contact with the raw material, is suitable for dispersing the building raw material M in, for example, the sheet width direction W through collision with the relay sheet 13 that performs undulating motion, before the building raw material M reaches the sieve sheets 12b of the sieve portion 10A in the unit U1. The more the building raw material M is dispersed before reaching the sieve sheets 12b of the sieve portion 10A, the more clogging of the sieve sheets 12b tends to be suppressed.

Then, when the building material manufacturing apparatus X5 is running, the portion of the building raw material M that is generated through the sieving in the sieve portion 10A of the unit U1 and passes through the sieve openings of the sieve sheets can form a raw material mat, and the portion of the building raw material M that is generated through the sieving in the sieve portion 10A of the unit U2 and passes through the sieve openings of the sieve sheets can form the layers that are to be a raw material mat (the routes by which the raw material falls from each sieve portion 10A are indicated by broken line arrows). Specifics are as follows.

Figure 15:
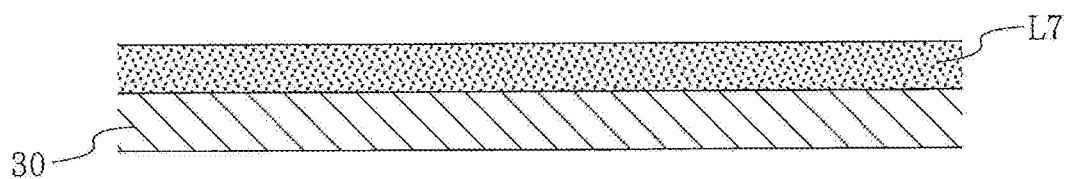
FIG. 15 shows a partial cross-sectional view of a state of layer formation of a mat on a receiving tool of the building material manufacturing apparatus shown in FIG. 14.
Figure 15:
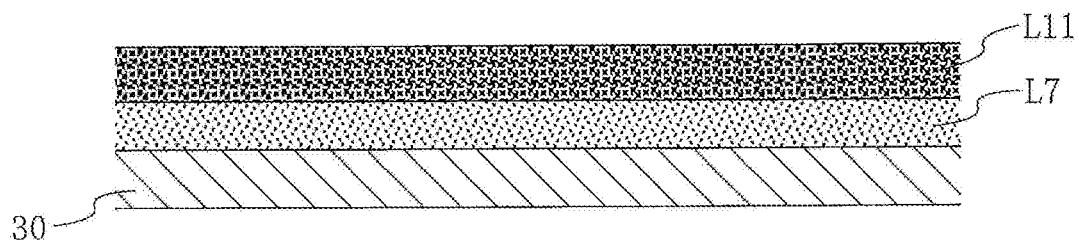
Figure 15:
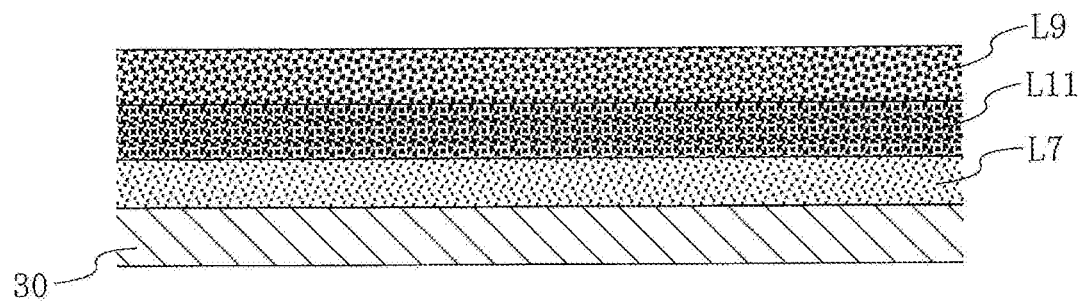
Figure 15:
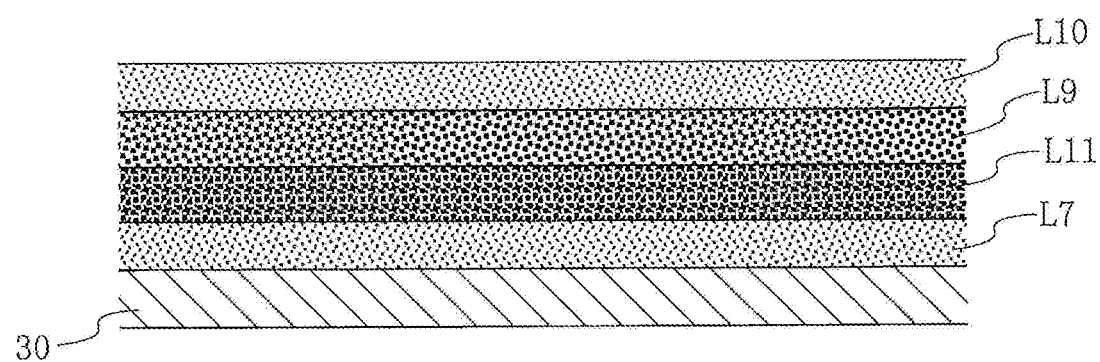

First, a predetermined amount of the portion of the building raw material M that has passed through the sieve openings of the sieve sheet 12a is accumulated on the receiving tool 30 that has been transported in the arrow d1 direction by the belt conveyor 31A and is passing directly below the sieve sheet 12a of the sieve portion 10A of the unit U1. Accordingly, a layer L7 (first layer) formed due to the accumulation of the relatively fine building raw material M that has passed through the fine sieve sheet 12a is formed on the receiving tool 30 as shown in FIG. 15(a). The receiving tool 30 is, for example, a mold plate having an uneven shape corresponding to a design surface of the building material to be manufactured on its inner surface (surface on the side that receives the building raw material M).

Next, a predetermined amount of the portion of the building raw material M that has passed through the sieve openings of the sieve sheet 12b is accumulated on the layer L7 on the receiving tool 30 that has been transported in the arrow d1 direction by the belt conveyor 31A and is passing directly below the sieve sheets 12b of the sieve portion 10A of the unit U1. Accordingly, a layer L11 (second layer) formed due to accumulation of the relatively coarse building raw material M that has passed through the coarse sieve sheets 12b is formed on the layer L7 as shown in FIG. 15(b).

Next, a predetermined amount of the portion of the building raw material M that has passed through the sieve openings of the sieve sheets 12b is accumulated on the layer L11 on the receiving tool 30 that has been transported in the arrow d1 direction by the belt conveyor 31A and is passing directly below the sieve sheets 12b of the sieve portion 10A of the unit U2. Accordingly, a layer L9 (third layer) formed due to the accumulation of the relatively coarse building raw material M that has passed through the coarse sieve sheets 12b is formed on the layer L11 as shown in FIG. 15(c).

Next, a predetermined amount of the portion of the building raw material M that has passed through the sieve openings of the sieve sheet 12a is accumulated on the layer L9 on the receiving tool 30 that has been transported in the arrow d1 direction by the belt conveyor 31A and is passing directly below the sieve sheet 12a of the sieve portion 10A of the unit U2. Accordingly, a layer L10 (fourth layer) formed due to the accumulation of the relatively fine building raw material M that has passed through the fine sieve sheet 12a is formed on the layer L9 as shown in FIG. 15(d).

Thereafter, the stacked body with the layers L7, L11, L9, and L10 is subjected to the above-described heat-pressing step, or the above-described heat-pressing step and then autoclave curing. The building material with the stacked structure including the cured layers formed from the layers is manufactured due to the stacked body with the layers L7, L11, L9, and L10 being subjected to a heat-pressing step, or a heat-pressing step and then autoclave curing.

The cured layers formed from the layers L7 and L10, which are accumulations of the relatively fine building raw material M, have a finer structure, and therefore are suitable for obtaining a higher water resistance, and thus are suitable for forming outer layers of the building material. The cured layer formed from the layers L11 and L9, which is an accumulation of the relatively coarse building raw material M, has a lower density and lighter structure, and therefore is suitable for obtaining a high cushion property, and thus is suitable for forming a core layer of the building material.

As described above, the building material manufacturing apparatus X5 is suitable for manufacturing the building material while suppressing clogging of the sieve sheets 12 in the sieve portion 10A for sieving the building raw material M. Suppression of clogging of the sieve sheets 12 is suitable for reducing the amount of time and labor needed for maintenance of the sieve sheets 12 and the sieve portion 10A, and thus is suitable from the viewpoint of suppressing the cost of manufacturing the building material.

Also, for reasons similar to those described above regarding the building material manufacturing apparatuses X1 and X2, the building material manufacturing apparatus X5 is preferable for avoiding an increase in the size of the apparatus and an increase in the size of the facility for manufacturing the building material, is preferable for avoiding frequent cleaning of the apparatus and the facility for manufacturing the building material, and thus is preferable for suppressing the cost of manufacturing the building material.

Figure 16:
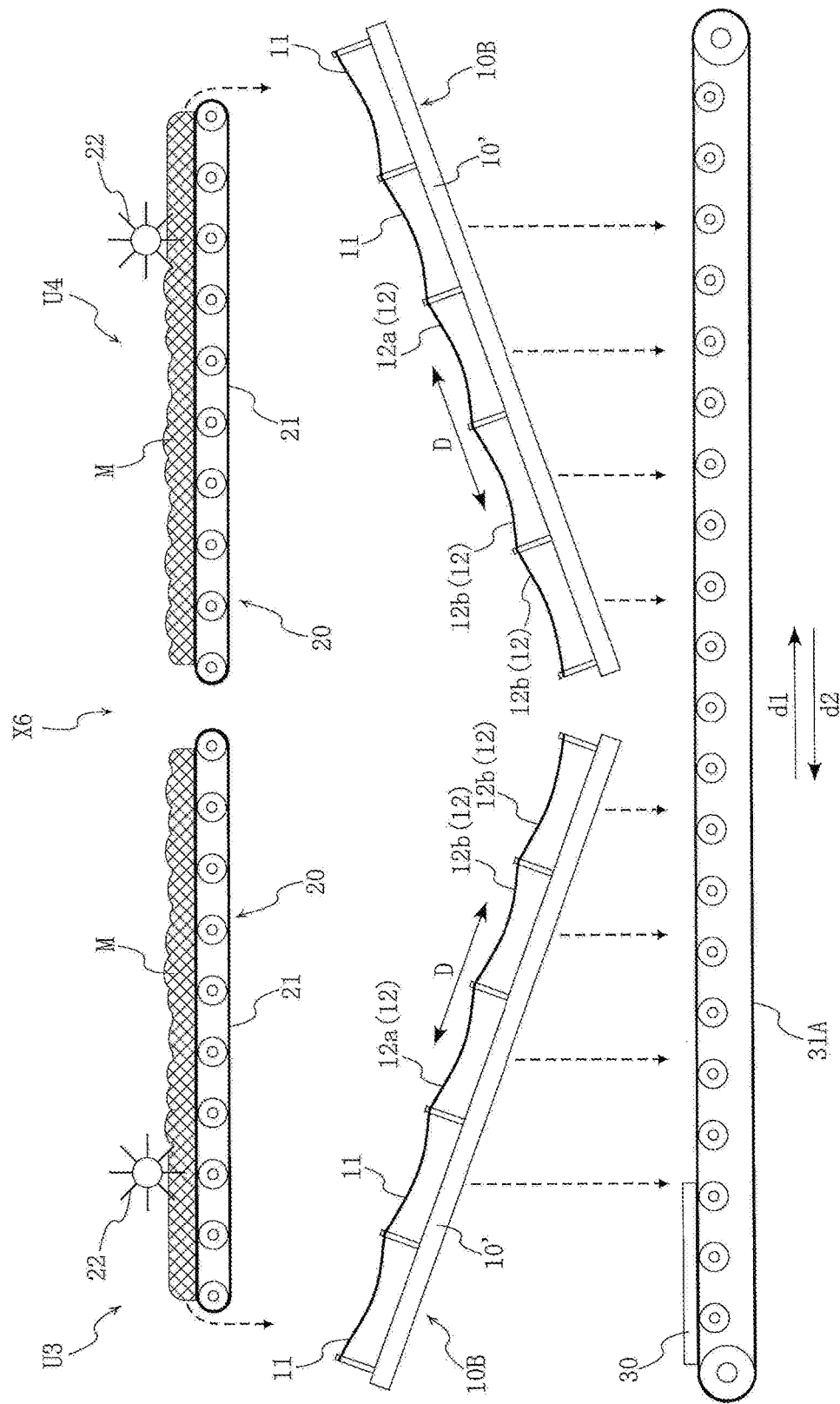
FIG. 16 is a diagram showing a schematic configuration of the building material manufacturing apparatus according to one embodiment of the present invention.

FIG. 16 shows a schematic configuration of a building material manufacturing apparatus X6 according to one embodiment of the present invention. The building material manufacturing apparatus X6 includes a unit U3, a unit U4, and the receiving tool 30. The unit U3 of the building material manufacturing apparatus X6 includes a sieve portion 10B and the above-described raw material supplying portion 20, and differs from the unit U1 of the building material manufacturing apparatus X4 in that it includes the sieve portion 10B instead of the sieve portion 10A. Also, the unit U4 of the building material manufacturing apparatus X6 includes a sieve portion 10B and the above-described raw material supplying portion 20, and differs from the unit U2 of the building material manufacturing apparatus X4 in that it includes the sieve portion 10B instead of the sieve portion 10A.

Figure 17:
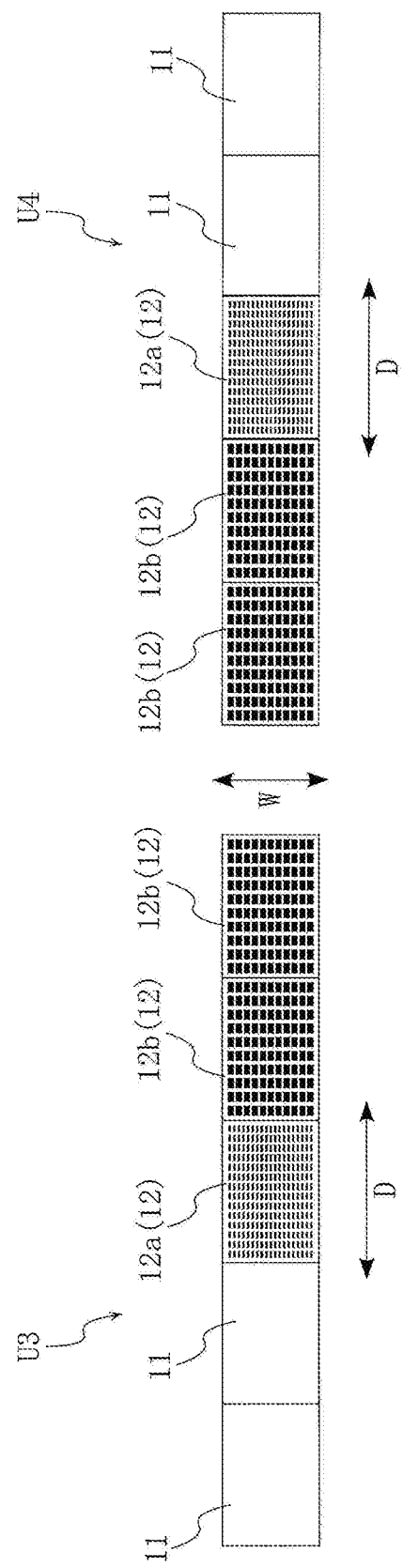
FIG. 17 is a diagram showing a sheet layout in the building material manufacturing apparatus shown in FIG. 16.

The sieve portion 10B includes a series of sheets that can perform undulating motion when the apparatus is running, are inclined, and are arranged side by side in the direction of the inclination, and the above-described main body structure portion 10' to which the series of sheets are attached, and which is for realizing the undulating motion of the sheets. The series of sheets in the sieve portion 10B include two receiving and sending sheets 11 with no sieve openings, and two types of sieve sheets 12a and 12b as the sieve sheets 12 with sieve openings. The coarse sieve sheets 12b are located below the fine sieve sheet 12a. The sheet layout configuration in the building material manufacturing apparatus X6 and the units U3 and U4 is shown in FIG. 17.

In the building material manufacturing apparatus X6, in the series of sheets of the unit U3, the receiving and sending sheets 11 are arranged spaced farther apart from the series of sheets of the unit U4 than the sieve sheets 12a and 12b. On the other hand, in the series of sheets of the unit U4, the receiving and sending sheet 11 is arranged spaced farther apart from the series of sheets of the unit U3 than the sieve sheets 12a and 12b.

When this building material manufacturing apparatus X6 is running, in each of the units U3 and U4, the building raw material M is continuously supplied from the raw material storage portion (not shown) to the raw material supplying portion 20, and the building raw material M is sent at, for example, a constant speed to a location above the receiving and sending sheet 11 at the upper end of the sieve portion 10B by the belt conveyor 21. On the belt conveyor 21, the building raw material M receives a leveling action performed by the rotating leveling portion 22 and its combing teeth.

Then, in each unit, in a state in which the series of sheets of the sieve portion 10B are performing undulating motion, the building raw material M is dropped from the raw material supplying portion 20 onto the receiving and sending sheet 11 at the upper end of the sieve portion 10B (the route by which the raw material falls from the raw material supplying portion 20 is indicated by a broken line arrow).

Some of the building raw materials M dropped from the raw material supplying portion 20 are in the form of bulky clumps. This building raw material M is first received in the sieve portion 10B of each unit by the receiving and sending sheet 11, which has no sieve openings and has a large area of contact with the raw material. This configuration is suitable for crushing the building raw material M in the form of bulky clumps through collision with the receiving and sending sheet 11 performing undulating motion before the building raw material M reaches the sieve sheets 12 of the sieve portion 10B. The more the crushing of the building raw material M progresses before reaching the sieve sheets 12 of the sieve portion 10B, the more clogging of the sieve sheets 12 tends to be suppressed.

In addition to this, the configuration in which the building raw material M dropped from the raw material supplying portion 20 is first received in the sieve portion 10B by the receiving and sending sheet 11, which has no sieve openings and has a large area of contact with the raw material, is suitable for dispersing the building raw material M in, for example, a sheet width direction W due to collision with the receiving and sending sheet 11 that performs undulating motion before the building raw material M reaches the sieve sheets 12 of the sieve portion 10B. The more the building raw material M is dispersed before reaching the sieve sheets 12 of the sieve portion 10B, the more clogging of the sieve sheets 12 tends to be suppressed.

Then, when the building material manufacturing apparatus X6 is running, a raw material mat can be formed from the portion of the building raw material M that is generated due to the sieving in the sieve portion 10B of the unit U3 and has passed through the sieve openings of the sieve sheets, and a raw material mat can be formed from the portion of the building raw material M that is generated due to the sieving in the sieve portion 10B of the unit U4 and has passed through the sieve openings of the sieve sheet (the routes by which the raw material falls from the sieve portion 10B are indicated by broken line arrows). Specifics are as follows.

Figure 18:
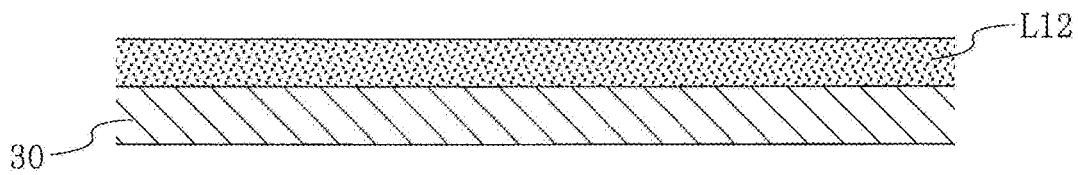
FIG. 18 shows a partial cross-sectional view of a state of layer formation of a mat on a receiving tool of the building material manufacturing apparatus shown in FIG. 16.
Figure 18:
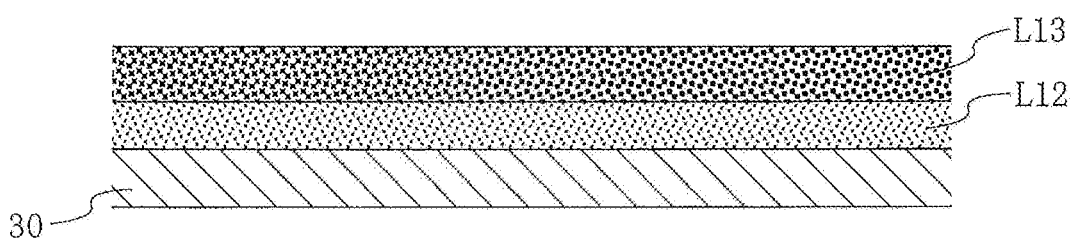
Figure 18:
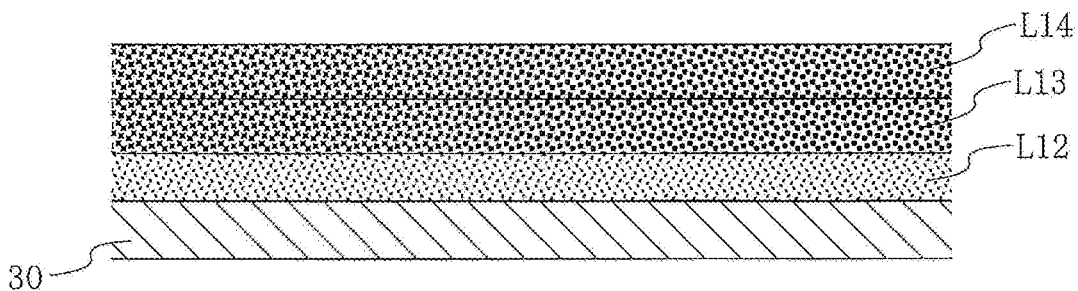
Figure 18:
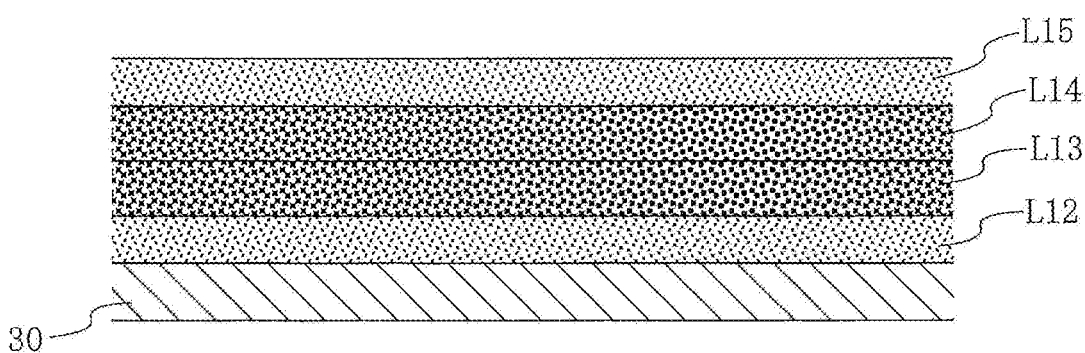

First, a predetermined amount of the portion of the building raw material M that has passed through the sieve openings of the sieve sheet 12a is accumulated on the receiving tool 30 that has been transported in the arrow d1 direction by the belt conveyor 31A and is passing directly below the sieve sheet 12a of the sieve portion 10B of the unit U3. Accordingly, a layer L12 (first layer) formed due to the accumulation of the relatively fine building raw material M that has passed through the fine sieve sheet 12a is formed on the receiving tool 30 as shown in FIG. 18(a). The receiving tool 30 is, for example, a mold plate having an uneven shape corresponding to a design surface of the building material to be manufactured on its inner surface (surface on the side that receives the building raw material M).

Next, a predetermined amount of the portion of the building raw material M that has passed through the sieve openings of the sieve sheet 12b is accumulated on the layer L12 on the receiving tool 30 that has been transported in the arrow d1 direction by the belt conveyor 31A and is passing directly below the sieve sheets 12b of the sieve portion 10B of the unit U3. Accordingly, a layer L13 (second layer) formed due to accumulation of the relatively coarse building raw material M that has passed through the coarse sieve sheets 12b is formed on the layer L12 as shown in FIG. 18(b).

Next, a predetermined amount of the portion of the building raw material M that has passed through the sieve openings of the sieve sheets 12b is accumulated on the layer L13 on the receiving tool 30 that has been transported in the arrow d1 direction by the belt conveyor 31A and is passing directly below the sieve sheets 12b of the sieve portion 10B of the unit U4. Accordingly, a layer L14 (third layer) formed due to accumulation of the relatively coarse building raw material M that has passed through the coarse sieve sheets 12b is formed on the layer L13 as shown in FIG. 18(c).

Next, a predetermined amount of the portion of the building raw material M that has passed through the sieve openings of the sieve sheet 12a is accumulated on the layer L14 on the receiving tool 30 that has been transported in the arrow d1 direction by the belt conveyor 31A and is passing directly below the sieve sheet 12a of the sieve portion 10B of the unit U4. Accordingly, a layer L15 (fourth layer) formed due to the accumulation of the relatively fine building raw material M that has passed through the fine sieve sheet 12a is formed on the layer 14 as shown in FIG. 18(d).

Thereafter, the stacked body with the layers L12, L13, L14, and L15 is subjected to the above-described heat-pressing step, or the above-described heat-pressing step and then autoclave curing. The building material with the stacked structure including the cured layers formed from the layers is obtained due to the stacked body with the layers L12, L13, L14, and L15 being subjected to the heat-pressing step, or being subjected to the heat-pressing step and then autoclave curing.

The cured layer formed from the layers L12 and L15, which is an accumulation of the relatively fine building raw material M, has a finer structure, and therefore is suitable for obtaining a higher water resistance, and thus is suitable for forming an outer layer of the building material. Since the cured layer formed from the layers L13 and L14, which is an accumulation of the relatively coarse building raw material M, has a lower density and lighter structure, it is suitable for obtaining a high cushion property, and thus is suitable for forming a core layer of the building material.

As described above, the building material manufacturing apparatus X6 is suitable for manufacturing the building material while suppressing clogging of the sieve sheets 12 in the sieve portion 10B for sieving the building raw material M. Suppression of clogging of the sieve sheets 12 is suitable for reducing the amount of time and labor needed for maintenance of the sieve sheets 12 and the sieve portion 10B, and thus is suitable from the viewpoint of suppressing the cost of manufacturing the building material.

Also, for reasons similar to those described above regarding the building material manufacturing apparatuses X1 and X2, the building material manufacturing apparatus X6 is preferable for avoiding an increase in the size of the apparatus and an increase in the size of the facility for manufacturing the building material, is preferable for avoiding frequent cleaning of the apparatus and the facility for manufacturing the building material, and thus is preferable for suppressing the cost of manufacturing the building material.

As described above, the sieve portions 10B of the units U3 and U4 of the building material manufacturing apparatus X6 include, on the upper ends of the series of sheets, two receiving and sending sheets 11 for performing the above-described crushing and dispersing on the building raw material M. This configuration is preferable for suppressing clogging of the sieve sheets 12.

LIST OF REFERENCE NUMERALS

| | |
|---|---|
| X1 to X6 | Building material manufacturing apparatus |
| U1 to U4 | Unit |
| 10, 10A, 10B | Sieve portion |
| 11 | Receiving and sending sheet |
| 12, 12a, 12b | Sieve sheet |
| 13 | Relay sheet |
| 20, 20A | Raw material supplying portion |
| 21, 21A | Conveyor |
| 22, 22A | Leveling portion |
| 30 | Receiving tool |
| 31, 31A | Transport line |

The invention claimed is:

1. A raw material mat forming apparatus, useful for manufacturing a building material, comprising:
   a sieve portion including a receiving and sending sheet with no sieve openings, onto which a building raw material is to be dropped, and at least one sieve sheet with sieve openings that is located below the receiving and sending sheet, the receiving and sending sheet and the sieve sheet being able to perform undulating motion and the receiving and sending sheet and the sieve sheet being inclined and arranged side by side in the direction of the inclination; and
   a receiving tool for receiving the building raw material that has passed through the sieve openings of the sieve portion,
   wherein the sieve portion includes, as the sieve sheet, a fine sieve sheet with small sieve openings, and a coarse sieve sheet that is located below the fine sieve sheet and has large sieve openings,
   wherein the sieve portion further includes a relay sheet with no sieve openings that is located between the fine sieve sheet and the coarse sieve sheet and can perform undulating motion.

2. The raw material mat forming apparatus according to claim 1, further comprising
   a raw material supplying portion including a conveyor for sending the building raw material to a location above the receiving and sending sheet of the sieve portion, and a leveling portion for leveling the building raw material sent on the conveyor.

3. The raw material mat forming apparatus according to claim 1 or 2, further comprising
   a raw material supplying portion for dropping the building raw material onto the relay sheet.

4. A raw material mat forming method, useful for manufacturing a building material, wherein
   using a sieve portion including a receiving and sending sheet with no sieve openings, onto which a building raw material is to be dropped, and at least one sieve sheet with sieve openings that is located below the receiving and sending sheet, the receiving and sending sheet and the sieve sheet being able to perform undulating motion and the receiving and sending sheet and the sieve sheet being inclined and arranged side by side in the direction of the inclination, and
   a receiving tool for receiving the building raw material that has passed through the sieve openings of the sieve portion,
   in a state in which the receiving and sending sheet and the at least one sieve sheet are performing undulating motion,
   the building raw material is dropped onto the receiving and sending sheet,
   the building raw material is moved from the receiving and sending sheet onto the at least one sieve sheet,
   sieving of the building raw material is performed by the at least one sieve sheet, and the building raw material that has passed through the sieve openings of the at least one sieve sheet is accumulated on the receiving tool, and a mat with at least one layer is formed, wherein the sieve portion includes, as the sieve sheet, a fine sieve sheet with small sieve openings, and a coarse sieve sheet that is located below the fine sieve sheet and has large sieve openings, and a mat including a layer formed by the building raw material that has passed through the sieve openings of the fine sieve sheet and a layer formed by the building raw material that has passed through the sieve openings of the coarse sieve sheet is formed on the receiving tool, wherein the sieve portion further includes a relay sheet with no sieve openings that is located between the fine sieve sheet and the coarse sieve sheet and can perform undulating motion, and in a state in which the relay sheet is performing undulating motion in addition to the receiving and sending sheet and the sieve sheet, the building raw material that does not pass through the sieve openings of the fine sieve sheet is moved onto the coarse sieve sheet via the relay sheet.

5. The raw material mat forming method according to claim 4, wherein a raw material supplying portion including a conveyor for sending the building raw material to a location above the receiving and sending sheet of the sieve portion, and a leveling portion for leveling the building raw material sent on the conveyor is further used, and the building raw material leveled by the leveling portion is dropped onto the receiving and sending sheet.

6. The raw material mat forming method according to claim 4 or 5, wherein the building raw material is dropped onto the relay sheet.

\* \* \* \* \*